United States Patent
Menis et al.

(10) Patent No.: US 12,105,180 B2
(45) Date of Patent: *Oct. 1, 2024

(54) RADAR LOCATION SYSTEM AND METHOD

(71) Applicant: Essence Security International (E.S.I.) Ltd., Herzliya Pituach (IL)

(72) Inventors: Boaz Menis, Tel Aviv (IL); Jacob Gabay, Rosh HaAyin (IL)

(73) Assignee: Essence Security International (E.S.I.) Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,267

(22) Filed: Jul. 20, 2023

(65) Prior Publication Data

US 2023/0375685 A1    Nov. 23, 2023

Related U.S. Application Data

(63) Continuation of application No. 17/394,110, filed on Aug. 4, 2021, now Pat. No. 11,754,697, which is a (Continued)

(30) Foreign Application Priority Data

Feb. 6, 2019  (IL) .......................................... 264696
Feb. 6, 2019  (IL) .......................................... 264697

(51) Int. Cl.
  *G01S 13/04*  (2006.01)
  *G01S 13/66*  (2006.01)
  (Continued)

(52) U.S. Cl.
  CPC .............. *G01S 13/04* (2013.01); *G01S 13/66* (2013.01); *G01S 13/886* (2013.01); *G08B 21/22* (2013.01)

(58) Field of Classification Search
  None
  See application file for complete search history.

(56) References Cited

U.S. PATENT DOCUMENTS 6,967,612 B1 * 11/2005 Gorman .................. G01S 13/04
                                                              342/52
7,439,902 B2    10/2008 Robertson et al.
(Continued)

FOREIGN PATENT DOCUMENTS

AU        2022204922       1/2024
CA           2721616      12/2009
(Continued)

OTHER PUBLICATIONS

"U.S. Appl. No. 17/394,110, Non Final Office Action mailed Jan. 10, 2023", 15 pgs.
(Continued)

*Primary Examiner* — Fekadeselassie Girma
(74) *Attorney, Agent, or Firm* — Schwegman Lundberg & Woessner, P.A.

(57) ABSTRACT

Methods of defining a virtual fence and for detecting a body inside or outside a region of interest defined by the virtual fence and/or of determining a height for a body on a surface in a region of interest use radar signals and a configuration mode and a monitoring mode are disclosed. In the configuration mode coordinates for defining a virtual fence are determined and/or a topology of a surface in the region of interest is determined. In the monitoring mode, a location of a second body on the surface is detected to determine if the second body is inside or outside the virtual fence and/or a height of for the second body relative to the determined topology is determined.

20 Claims, 18 Drawing Sheets

Related U.S. Application Data continuation of application No. PCT/IL2020/050130, filed on Feb. 4, 2020.

(51) Int. Cl.
  *G01S 13/88* (2006.01)
  *G08B 21/22* (2006.01)

(56) References Cited

U.S. PATENT DOCUMENTS

| | | | |
|---|---|---|---|
| 7,463,182 B1* | 12/2008 | Morinaga | G01S 13/931 342/107 |
| 8,547,433 B2 | 10/2013 | Amir | |
| 8,970,374 B2 | 3/2015 | Guetta et al. | |
| 10,656,264 B2* | 5/2020 | Lee | G01S 13/886 |
| 10,657,784 B1 | 5/2020 | Gordon et al. | |
| 11,348,140 B2* | 5/2022 | Busch | H04W 4/029 |
| 11,385,345 B2* | 7/2022 | Lee | G01S 13/886 |
| 11,754,697 B2* | 9/2023 | Menis | G01S 7/415 340/552 |
| 11,794,697 B2* | 10/2023 | Rapp | B60S 1/3805 |
| 2003/0164790 A1* | 9/2003 | Kurita | G01S 13/04 340/541 |
| 2012/0188081 A1 | 7/2012 | Van | |
| 2012/0327242 A1 | 12/2012 | Barley et al. | |
| 2013/0002434 A1* | 1/2013 | Cuddihy | G01S 13/18 342/28 |
| 2013/0038490 A1* | 2/2013 | Garcia | G01S 13/74 342/451 |
| 2013/0320863 A1 | 12/2013 | Mitchell et al. | |
| 2014/0300735 A1 | 10/2014 | Reibel et al. | |
| 2018/0192919 A1* | 7/2018 | Nakayama | A61B 5/1116 |
| 2018/0292520 A1* | 10/2018 | Bermudez | F24F 11/30 |
| 2018/0342160 A1* | 11/2018 | Komori | G05D 1/0246 |
| 2018/0364350 A1* | 12/2018 | Lee | G01S 13/87 |
| 2019/0188492 A1 | 6/2019 | Kaestle et al. | |
| 2019/0259270 A1 | 8/2019 | Amini et al. | |
| 2020/0278443 A1* | 9/2020 | Lee | G08B 13/2491 |
| 2022/0283279 A1* | 9/2022 | Menis | G01S 7/003 |
| 2023/0245541 A1 | 8/2023 | Amir et al. | |

FOREIGN PATENT DOCUMENTS

| | | |
|---|---|---|
| CN | 110728817 | 1/2020 |
| DE | 102013215207 A1 | 2/2015 |
| EP | 2353293 | 8/2011 |
| EP | 2784535 A1 | 10/2014 |
| EP | 2911125 | 8/2015 |
| EP | 2984817 | 11/2016 |
| EP | 2318804 | 3/2017 |
| EP | 3203454 | 11/2017 |
| EP | 4154232 | 3/2023 |
| GB | 2266799 | 11/1993 |
| GB | 2488337 | 8/2012 |
| IL | 276002 | 2/2022 |
| KR | 101690781 B1 | 12/2016 |
| KR | 101928995 | 12/2018 |
| KR | 20180129240 | 12/2018 |
| NL | 1037342 | 4/2011 |
| WO | 2006093527 | 9/2006 |
| WO | 2009144707 | 12/2009 |
| WO | 2010052661 | 5/2010 |
| WO | WO-2020161703 A2 | 8/2020 |
| WO | 2020223318 | 11/2020 |
| WO | 2022013863 | 1/2022 |
| WO | 2022013864 | 1/2022 |
| WO | 2022144876 | 7/2022 |

OTHER PUBLICATIONS

"U.S. Appl. No. 17/394,110, Notice of Allowance mailed May 10, 2023", 10 pgs.

"U.S. Appl. No. 17/394,110, Preliminary Amendment filed Oct. 11, 2021", 11 pages.

"U.S. Appl. No. 17/394,110, Response filed Apr. 10, 2023 to Non Final Office Action mailed Jan. 10, 2023", 11 pgs.

"International Application Serial No. PCT/IL2020/050130, International Search Report mailed Aug. 18, 2020", 11 pgs.

"International Application Serial No. PCT/IL2020/050130, Written Opinion mailed Aug. 18, 2020", 24 pgs.

"Israeli Application Serial No. IL264696, Office Action mailed Oct. 7, 2021", 8 pgs.

"Israeli Application Serial No. IL264697, Office Action mailed Oct. 10, 2021", 7 pgs.

"European Application No. 21748967.3 Communication pursuant to Rule 94(3) EPC mailed Jan. 31, 2024", 6 pgs.

* cited by examiner

RADAR LOCATION SYSTEM AND METHOD

RELATED APPLICATIONS

This application is a continuation of U.S. application Ser. No. 17/394,110, filed Aug. 4, 2021, which claims the benefit of priority to International Application No. PCT/IL2020/05013, filed Feb. 4, 2020, which claims the benefit of priority to Israel Application No. 264696, filed 6 Feb. 2019 and claims the benefit of priority to Israel Application No. 264697, filed 6 Feb. 2019, all of which are incorporated by reference herein in their entireties.

FIELD OF THE INVENTION

The present invention relates generally to a system and a method for radar location and more specifically to a system and method for defining a virtual fence and for detecting a location of a body with reference to a region of interest defined by the virtual fence and a system and method for determining a height associated with a body on a surface in a region of interest.

BACKGROUND INFORMATION

There is often a need to be able to monitor a region of interest. This may be for warning of intrusion into the region of interest or for detecting when a body leaves the region of interest. One known method is a geofence defined with regard to geocoordinates, such as using GPS. Mobile telephones are examples of GPS capable devices and can hence be used for the detection of users carrying mobile telephones entering or leaving geofences. However, this requires a user to carry a GPS device. Also, it requires the use of global coordinates and the defining of a geofence in these coordinates.

Some prior art arrangements can allow for the setting up of a virtual fence and the detection of a body entering or leaving the virtual fence. However, defining and/or using the virtual fence may require multiple sensing devices and/or systems that can provide challenges in set-up, implementation and/or maintenance.

SUMMARY OF THE INVENTION

A first aspect of the present invention provides a processing system for defining a virtual fence and for detecting a body inside or outside a region of interest defined by the virtual fence, the processing system comprising an input to receive radar signals from a radar antenna configuration; and a processor to operate in a configuration mode to process the radar signals to identify locations that lie along a boundary of a region of interest across a surface and are associated with at least one first body, and to process the identified locations to determine coordinates for defining the virtual fence, and to operate in a monitoring mode to process the radar signals to detect a location of a second body on the surface to determine if the second body is inside or outside the virtual fence.

A second aspect of the present invention provides a method of defining a virtual fence and for detecting a body inside or outside a region of interest defined by the virtual fence, the method comprising receiving radar signals from a radar antenna configuration; in a configuration mode, processing the radar signals to identify locations that lie along a boundary of a region of interest across a surface and are associated with at least one first body, and processing the identified locations to determine coordinates for defining the virtual fence; and in a monitoring mode, processing the radar signals to detect a location of a second body on the surface to determine if the second body is inside or outside the virtual fence.

These aspects of the invention may advantageously provide an easy-to-use locating means/method, which involves defining a virtual fence using radar and subsequently detecting the location of a body relative to the virtual fence using radar.

The surface may be an indoor surface, e.g., an area or flooring, or an outdoor surface, e.g., a terrain.

In one or more embodiments, the radar signals are processed to identify at least one known signal signature to identify the locations associated with the at least one first body. The at least one known signature may be from a single first body at different times, or different first bodies at a common time or at different times. Hence, in the configuration mode the locations identified and used to define the virtual fence can result from radar reflections from a single body that is moved to be detected at multiple locations, a plurality of bodies that are moved to be detected at multiple locations, or multiple static bodies at the required locations to define the virtual fence. The body or bodies can include or comprise a reflector (i.e., a device for radar reflection, e.g., a retroreflector, such as a corner reflector) having known radar properties, including a radar cross section, and it or they can be positioned statically or moved in a particular manner to provide a known radar reflection characteristic. For example, the body or bodies could be tilted or rotated in a defined manner so that the radar reflective characteristics change over time and these changing characteristics can be detected from received radar signals.

As used herein, the terms "body" and "object" are interchangeable, and may be human or non-human, unless specified as being one or the other. The object may be something that can move, e.g., as a person, animal or vehicle, or it may be something that is moved, e.g., as a radar reflector carried by a person. In some embodiments, the object may be human in combination with one or more inanimate objects, e.g., a radar reflector, held by or on the human.

In one or more embodiments, a single first body is used in the monitoring mode and locations associated with the first body are tracked as the first body traverses a path along the boundary. This method of operation avoids the need for multiple objects and provides an easily implemented set-up method in which the object's location is tracked around the boundary. The object can comprise a person and/or a reflector, the object having a known signature by having known radar properties (e.g. size, reflectivity, radar-cross section, etc.) and/or known kinematic properties relative to the position and orientation of the radar antenna configuration (e.g. it can be positioned statically or can moved in a particular manner to provide a known radar reflection movement characteristic).

For example, a reflector could be tilted or rotated in a defined manner as it traverses the path so that the radar reflective characteristics change over time and these changing characteristics can be detected from received radar signals. For example, the reflector may be moved around the region of interest and to be recognized for each identified location the reflector position may be paused along its path and the reflector can be tilted or rotated toward and then away from the radar antenna configuration or may be uncovered and then covered to provide a relatively high reflection for a known period of time. Additionally, or alternatively, the reflector may have its location moved in a certain pattern or other defined manner In any case the radar signature may be determined to be known by matching, or otherwise being correlated with, one or more predefined signatures.

In another example, the radar signature may comprise a minimum radar cross section (or a cross section range), minimum size (or a size range), and a minimum movement metric, e.g. a minimum velocity (or a velocity range), wherein the radar cross section, size and movement metric are within a characteristic range for a human, or an adult human, or a human/adult human carrying a reflector device, which may be a known reflector device.

In one or more embodiments, the coordinates of the virtual fence are defined relative to the radar antenna configuration. This provides a local coordinate or reference system and does not rely on or require an external or absolute coordinate system.

In one or more embodiments, the virtual fence defines a closed region of the surface relative to the radar antenna configuration. A closed region provides a simple region for monitoring purposes.

In one or more embodiments, in which the path traversed by the first body is tracked to identify the locations, if the path traversed by the first body does not start and end at the radar antenna configuration, the processor is configured to process the tracked locations to extrapolate at least one of a start location and an end location of the first body to a location of the radar antenna configuration to define the closed region of the virtual fence. This avoids the need to a user to require a first body to have to traverse locations starting exactly at the radar antenna and ending exactly at the radar antenna in order to define the closed region.

In one or more embodiments, the processor is configured to generate an output when the second body is determined to be inside the virtual fence. This provides a simple method of detecting when the body is within the virtual fence without knowing a historical/previous location of the second body and, further, the system can ignore radar signals for the object when it is outside the virtual fence.

In one or more embodiments, the processor is configured to generate an output when a change of the location of the second body from inside to outside or outside to inside is detected. This allows for an event-based output to indicate a change in status of the body and can act as a warning or trigger and action.

In one or more embodiments, in the monitoring mode, the processor is configured to process the radar signals to detect the location of the second body traversing the surface by determining that the second body is moving and detecting the location of the moving second body. More specifically, it is firstly determined that a something is moving, and that something meets certain criteria to be classified as being of interest, and if so, its location is determined, and it is thereafter tracked. This embodiment is for avoiding false detections of static objects, such as surface features (trees, buildings, structures, etc.), and objects having radar reflection properties that are atypical of a body class(es) of interest (e.g. potentially human)

In one or more embodiments, the processor is configured to determine whether the second body is inside or outside the virtual fence by generating a projection and counting the number of times the projection crosses the virtual fence, an odd number of crossings indicating that the second body is located inside the virtual fence and an even or zero number of crossings indicating that the second body is located outside the virtual fence. This embodiment represents one method of determining whether the location of the object is inside or outside the virtual fence. The present invention, however, encompasses any method of comparing the location of the object to the locations defining the virtual fence to determine whether the detected location is inside or outside the virtual fence.

In one or more embodiments, the processor is configured to detect the second body when the second body has a radar cross section with a defined range. The use of a defined range for the radar cross section of the second body provides some level of discrimination on the size (and type) of an object and hence can assist in avoiding false detections.

In one or more embodiments, the at least one first body has a defined or known radar signature, which may comprise a known radar cross section. The configuration mode can be assisted if the radar cross section associated with the object is known or within a defined range, or at least greater than a predefined minimum since the location of the at least one first object can be more easily detected.

In one or more embodiments, the first and/or second body can comprise a person. Hence, this embodiment can be used for the detection of a person inside (or outside) a region of interest defined by a virtual fence. It can hence be used for security e.g. intruder detection or prisoner escape, or safety e.g. person entering a hazardous zone, e.g. a swimming pool in some embodiments. Thus, as will be appreciated, the first body may be a person installing/setting up the radar and the second body may be a different person.

In one or more embodiments, the processor is configured to process the identified location of the first body to define the virtual fence as a polygon by approximating a plurality of identified locations as a lesser plurality of locations with paths therebetween defining the polygon. The location data points obtained during the configuration mode can be large and many of these data points may be redundant. Also, the data required to define a virtual fence can be reduced by reducing the points defining the virtual fence using approximations of the points to reduce the number of sides of a polygon formed by lines between each identified location of the first body. This reduces data storage requirements and simplifies processing.

In one or more embodiments, the processor is configured to approximate the plurality of identified locations as a lesser plurality of locations with paths between defining the polygon by preferentially selecting locations with larger angles to neighboring locations as points in the lesser plurality of points.

In one or more embodiments, the radar signals comprise 3D radar signals, which provide radar information for different coordinates in a 3-dimensional space, and the processor is configured to identify locations associated with the first body in 3D. The present invention can be implemented in one embodiment using 2D radar whereby the radar is arranged to cover a plane roughly parallel to the surface of the region of interest. However, where the surface undulate significantly, 3D radar has advantages. Additionally, 3D radar has advantages in relation to ease of installation, even for flat surfaces, by allowing compensation of angular misalignments of the radar antenna configuration with respect to the surface. For example, even if X-Y plane of a 3D radar is significantly off parallel to the surface of the region of interest, the radar can still be used to accurately map the virtual fence at a known height above the surface of the region of interest by using the Z coordinate from the radar.

In one or more embodiments, the processor is configured in the configuration mode to determine a plane of best fit to map the identified locations onto the plane for the determination of the virtual fence in the plane, and in the monitoring mode locations associated with the second body are tracked in 3D and to map the tracked locations associated with the second body onto the plane for the determination of whether the second body is inside or outside the virtual fence in the plane.

For example, in some embodiments, the processor is configured in the configuration mode to determine a plane of best fit through the identified locations, for example according to least-squares, to map the identified locations onto the plane of best fit, and to use the mapped locations for the determination of the virtual fence in the plane. In the monitoring mode, the processor may be configured, in some embodiments, to identify locations associated with the second body in 3D and to map the identified locations associated with the second body to the plane of best fit, for the determination of whether the second body crosses the virtual fence in the plane. In this embodiment, although the locations associated with the second body are determined in 3D, the use of a 2D virtual fence simplifies the detection process. The plane of best fit may be determined for example to minimize error according to least-squares. The mapping of the locations of the first and second body to the plane of best fit may be, for example, using a projection direction orthogonal to the plane of best fit or a projection for minimal error according to least squares or by using only horizontal coordinates of each location and ignoring a vertical component of the location. Alternatively, the polygon defining the virtual fence is determined by projecting the locations in the z direction to the plane.

In some embodiments, a rotation matrix may be used to rotate the coordinate system such that the plane of best fit lies in 2 dimensions of the rotated coordinate system. In one or more embodiments, the processor is configured in the configuration mode to determine and track locations associated with the first body in 3D to provide coordinates for the virtual fence in 3D and to process the tracked location to define the virtual fence in 3D, and in the monitoring mode to track locations associated with the second body in 3D and to determine if the second body is inside or outside the 3D virtual fence. In this embodiment, the use of 3D locations and a 3D virtual fence compensates for significant undulations in the surface.

In one or more embodiments, the identified locations associated with the first body include additional locations across the surface and the first body, wherein the locations associated with the first body are at a known height above the surface, and the processor is configured in the configuration mode to determine a topology of the surface using the identified locations associated with the first body in 3D and the known height. This embodiment provides for the topological mapping of the region of interest by identifying locations associated with the first body as it traverses the topology.

In some embodiments, a rotation matrix may be used, as above, to rotate the coordinate system such that the plane of best fit lies in 2 dimensions of the rotated coordinate system. A distance between a location associated with the second body and a determined surface of the region of interest, in a direction orthogonal to the plane of best fit, may be used to provide an indication of an elevation/height of the location with respect to surface.

In other embodiments, a distance between a location associated the second body and a determined surface of the region of interest, in a Z direction, may be used to provide an indication of an elevation/height of the location with respect to surface.

In one or more embodiments, the virtual fence defines a closed region of the surface relative to the radar antenna configuration and the additional locations are within the closed region.

In one or more embodiments, the virtual fence can be modified automatically or manually. The coordinates defining the virtual fence can be changed based on an input, such as an input from a user interface or from a remote input, for example the virtual fence may be displayed on touch screen and manipulated via the touchscreen to alter its shape. This enables the extrapolation or adjustment of the virtual fence from the coordinates obtained from the identification of the locations of the at least one first object in the monitoring mode.

In one or more embodiments, in the monitoring mode, at least one further virtual fence can be defined. The at least one further virtual fence can be separate from the virtual fence or the at least one virtual fence can be contained within the virtual fence, defined outside and around the virtual fence, or if there are a plurality of further virtual fences, one or more may be contained within the virtual fence and one or more defined outside and around the virtual fence. In the monitoring mode, the location of the second body can be determined to determine if the second body is inside or outside the at least one further virtual fence. The at least one further virtual fence can be defined from a modification of the virtual fence or by separate processing of the radar signals to identify locations associated with at least one first body to provide coordinates of the at least one further virtual fence. The virtual fences can be used to generate a first indication if the second body is determined to be inside the virtual fence and at least one second indication if the second body is determined to be inside the at least one further virtual fence.

A third aspect of the present invention also provides a system for defining a virtual fence and for detecting a body inside or outside a region of interest defined by the virtual fence, the system comprising a radar antenna configuration to emit radiation and detect the emitted radiation reflected from the first or second body as radar signals; and a processing system as defined in any of the embodiments above.

In one or more embodiments, the system includes a passive infrared sensor device for sensing a human or animal body as the second body in the proximity of the virtual fence and for outputting a detection signal, wherein the processor is configured to be in a dormant low power or off-state mode and to be responsive to the detection signal to switch to the monitoring mode. In one or more embodiments, the processor is configured to return to the dormant low power or off-state mode upon determining satisfaction of a predefined condition related to radar signal detection. For example, the condition may be the absence of the detection signal or may be a predefined period after ceasing of a) the detection signal and/or b) changes to a detected radar signal that are indicative of moving body within the region defined by the virtual fence. Hence, the infrared sensor enables the efficient control of the system to avoid unnecessary activation when a body is not in the vicinity of the region of interest.

In one or more embodiments, the radar antenna configuration is arranged to emit and detect in a plane parallel to the surface and a determined height above the surface.

A fourth aspect of the present invention also provides a processing system for determining a height associated with a body on a surface in a region of interest, the system comprising an input to receive 3D radar signals from a radar antenna configuration; and a processor to operate in a configuration mode to process the 3D radar signals to determine 3D locations associated with at least one first body on a surface in the region of interest, the locations associated with the at least one first body being at a known height above the surface, and to process the determined 3D locations using the known height to determine a topology of the surface, and to operate in a monitoring mode to process the 3D radar signals to determine a 3D location associated with a second body on the surface in the region of interest, and to determine a height associated with the second body relative to the determined topology of the surface.

A fifth aspect of the present invention further provides a method of determining a height associated with a body on a surface in a region of interest, the method comprising receiving 3D radar signals from a radar antenna configuration; in a configuration mode, processing the 3D radar signals to determine 3D locations associated with at least one first body on a surface in the region of interest, the locations associated with the at least one first body being at a known height above the surface, and processing the determined 3D locations using the known height to determine a topology of the surface; and in a monitoring mode, processing the 3D radar signals to determine a 3D location associated with a second body on the surface in the region of interest, and determine a height of associated with the second body relative to the determined topology of the surface.

Hence, the location associated with the second body can be detected in the monitoring mode relative to the topology of the surface to assist in discriminating between a desired object to be detected and other objects. This is made possible by the mapping of the surface using a known height of the or each first body/object to allow the height of the second body/object above the surface to be determined by using the same radar antenna configuration.

In one or more embodiments, the region of interest is defined relative to the radar antenna configuration. This provides a local coordinate or reference system and does not rely on or require an external or absolute coordinate system.

In one or more embodiments, the region of interest comprises a closed region of the surface relative to the radar antenna configuration. A closed region provides a simple region for monitoring purposes.

In one or more embodiments, the processor is configured to detect the second body using a radar cross section of the second body.

In one or more embodiments, the processor is configured to detect the second body when the second body has a radar cross section within a defined range. The use of a defined range for the radar cross section of the second body provides some level of discrimination on the size (and type) of an object and hence can assist in avoiding false detections.

In one or more embodiments, the processor is configured to detect the second body when it is moving. This embodiment avoids detections of static, inconsequential objects, such as fixed environmental features (trees, buildings, structures, etc.).

In one or more embodiments, each first body has a defined or known radar cross section.

In one or more embodiments, the at least one first body and the second body each comprise a person. Hence, this embodiment can be used for the detection of a person in a region of interest defined by a virtual fence. It can hence be used for security e.g., intruder detection or prisoner escape, or safety e.g., person entering a hazardous zone.

In one or more embodiments, the processor is configured to generate an output when the second body is detected.

In one or more embodiments, the locations associated with the at least one first body are locations of a radar measurement centre of the or each first body and the height associated with the second body is an elevation above the surface of a radar measurement centre of the second body.

The present invention further provides system for determining a height associated with a body on a surface in a region of interest, the system comprising a radar antenna configuration to emit radiation and detect the emitted radiation reflected from the first or second body as 3D radar signals; and a processing system as defined in any embodiments above.

In one or more embodiments, the system includes a passive infrared sensor device for sensing a human or animal body as the second body in the region of interest and for outputting a detection signal, wherein the processor is configured to be in a dormant low power or off state mode and to be responsive to the detection signal to switch to the monitoring mode. In one or more embodiments, the processor is configured to return to the dormant low power or off state mode in the absence of the detection signal. Hence, the infrared sensor enables the efficient control of the system to avoid unnecessary activation when a body is not in the vicinity of the region of interest.

The first aspect of the invention can be used in combination with the fourth aspect of the invention. The second aspect of the invention can be used in combination with the fifth aspect of the invention.

The present invention also provides a carrier medium carrying processor implementable code, which, when executed by a processor, implement the processes of any of the embodiments described above.

In one or more embodiments, the carrier medium, can comprise a non-transient storage medium storing code for execution by a processor of a machine to carry out the method, or a transient medium carrying processor executable code for execution by a processor of a machine to carry out the method. Embodiments can be implemented in programmable digital logic that implements computer code. The code can be supplied to the programmable logic, such as a processor or microprocessor, on a carrier medium. One such embodiment of a carrier medium is a transient medium i.e., a signal such as an electrical, electromagnetic, acoustic, magnetic, or optical signal. Another form of carrier medium is a non-transitory storage medium that stores the code, such as a solid-state memory, magnetic media (hard disk drive), or optical media (Compact disc (CD) or digital versatile disc (DVD)).

DETAILED DESCRIPTION

Figure 1:
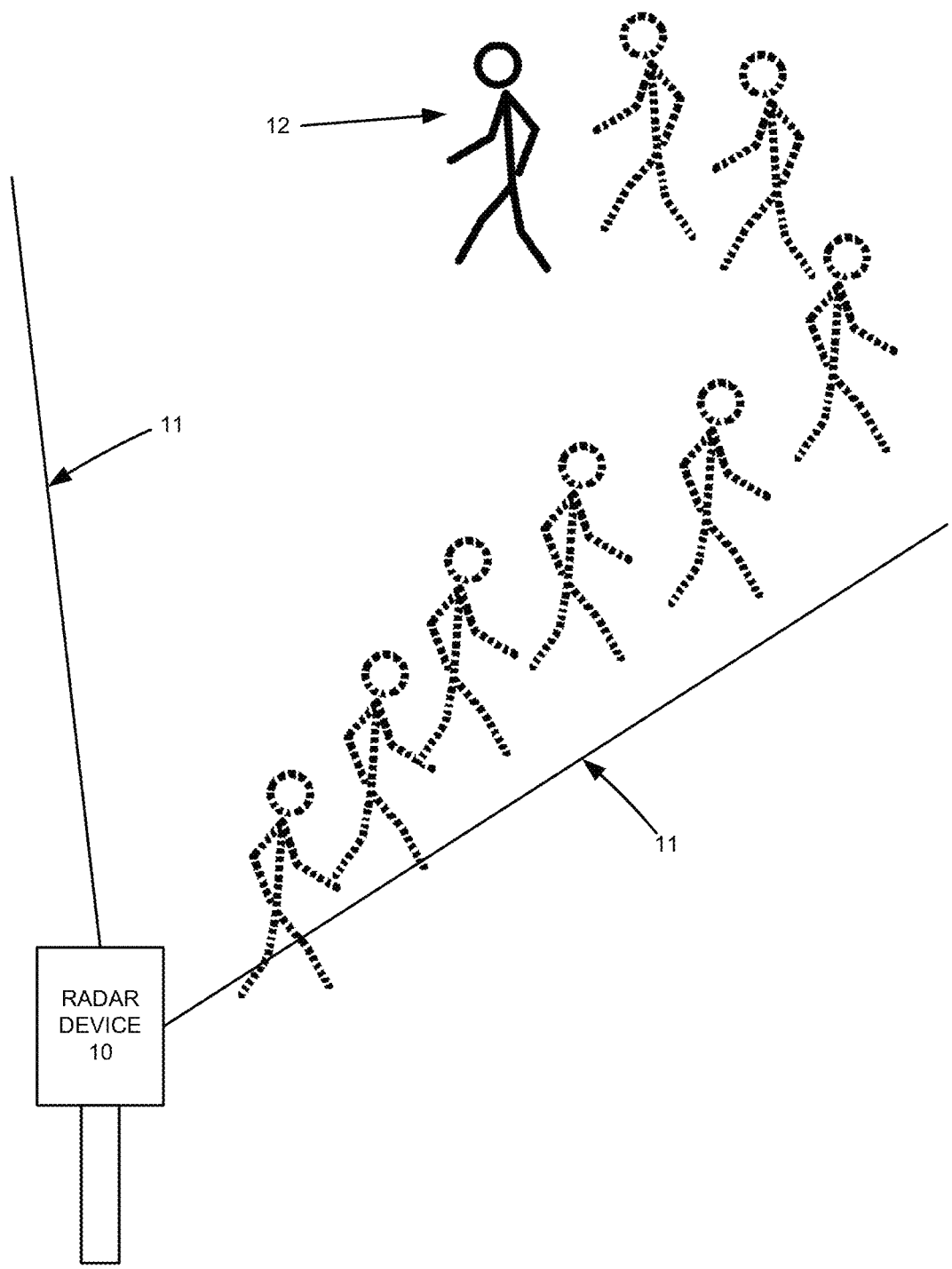
FIG. 1 is a schematic diagram illustrating an example of the method of defining a virtual fence.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

As used herein, except wherein the context requires otherwise, the terms "comprises", "includes", "has" and grammatical variants of these terms, are not intended to be exhaustive. They are intended to allow for the possibility of further additives, components, integers or steps.

Specific Embodiments will now be Described with Reference to the Drawings.

FIG. 1 is a schematic diagram illustrating a method of defining a virtual fence in which a radar device 10 is positioned with a field of view 11 to track the location of a first body, which in this embodiment comprises a person 12 walking around a desired path to define the location of a virtual fence. In this example a radar device 10 is installed to monitor a region of interest. The region of interest in some embodiments is limited to being within 100 meters, or in some embodiments within 50 meters of the radar device For each radar measurement, for a specific time in a series of time-spaced radar measurements, the radar measurement may include a set of one or more measurement points that make up a "point cloud". Each point in the point cloud may be defined by a spatial position from which a radar reflection was received, and defining a peak reflection value, and a doppler value from that spatial position. Thus, a measurement received from a radar-reflective object may be defined by a single point, or a cluster of points from different positions on the object, depending on its size. In cases where a cluster of measurement points are received from the objects, a location of a particular part/point on the object, e.g., its measurement centre, may be determined from the cluster of measurement point positions. The objects measurement centre is in some embodiments a weighted centre of the measurement points. The locations may be weighted according to a Radar Cross Section (RCS) estimate of each measurement point, where for each measurement point the RCS estimate may be calculated a constant (which may be determined empirically for the radar device) multiplied by the signal to noise ratio for the measurement divided by $R^4$, where R is the distance from the radar antenna configuration to the position corresponding to the measurement point. The weighted centre, WC, of the measurement points for an object may be calculated for each dimension as:

Where:

$$WC = \frac{1}{\sum_{n=1}^{N} W_n} \sum_{n=1}^{N} (W_n P_n)$$

N is the number of measurement points for the object;
$W_n$ is the RCS estimate for the $n^{th}$ measurement point; and
$P_n$ is the location (e.g., its coordinate) for the $n^{th}$ measurement point in that dimension.

For some objects, there may be only a single measurement point reflected from the object due to the size of the object being comparable to or smaller than the resolution of the radar. For such objects the measurement centre and the measurement point are the same. However, in some embodiments, identification of an object by the radar, during configuration and during monitoring, may advantageously require a cluster of points so as to filter noise or reject small objects.

In the case of a 2D radar, the location of the measurement centre may be defined by each of the two dimensions parallel the surface of the region of interest (e.g., and x, y coordinate). In the case of a 3D radar, a third dimension may be included (e.g., z coordinate). For each of the embodiments described herein, a data point representing a location associated with an object may be a location of its measurement centre, determined from the positions of points in the point cloud that are associated with the object.

Figure 2:
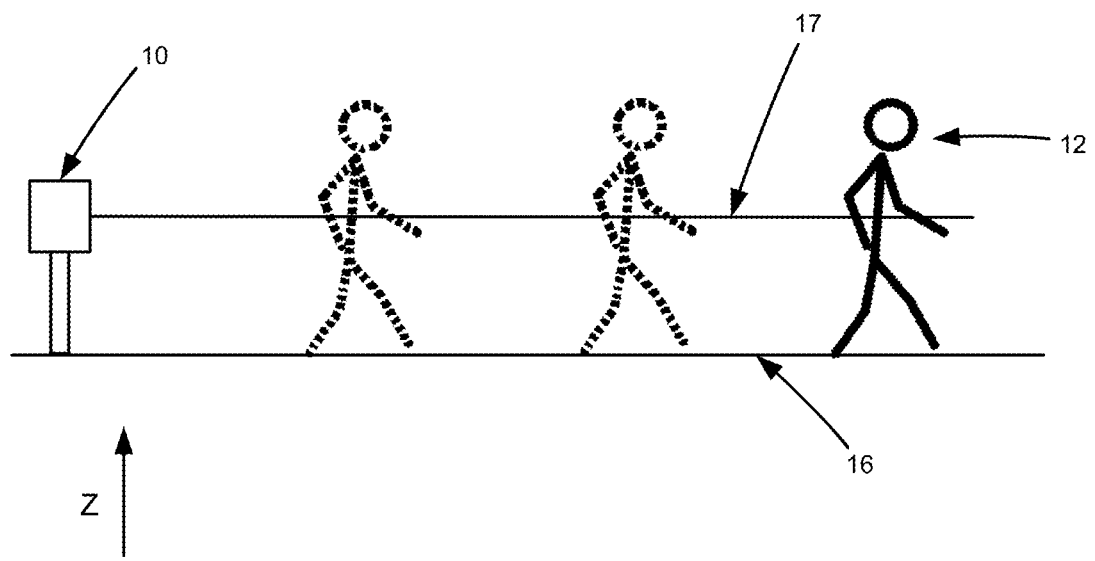
FIG. 2 is a schematic diagram illustrating a side view of the method of FIG. 1.

FIG. 2 is a schematic diagram illustrating a side view of the method of FIG. 1 illustrating the location of a 2D plane 17 (in the x, y plane) of the radar field from a radar device 10 at a known height above the surface, in the z direction. In this embodiment, the radar device 10 may be 2D or 3D radar device, but for will discussed in the context of it being a 2D device since such a device is more limiting than a 3D device. The radar device 10 is mounted to lie above and roughly parallel (e.g., within 20° or more accurately within 10°) to a notional plane of the surface 16 of the region of interest being monitored in the z direction at a height suitable for detecting the object. In this embodiment the body is a standing human and hence the radar device 10 is set at a known height suitable for obtaining reflections from a human, for example at a height approximately the same as the height of a measurement centre of an average, or otherwise representative, standing human. The height at which the radar device is set is, in some embodiments, 1.1 meter, which may be accurate, for example, to within 20% or, in more specific embodiments, within 10%. In the example of FIG. 2, the surface 16 of the region of interest is substantially flat.

Figure 3:
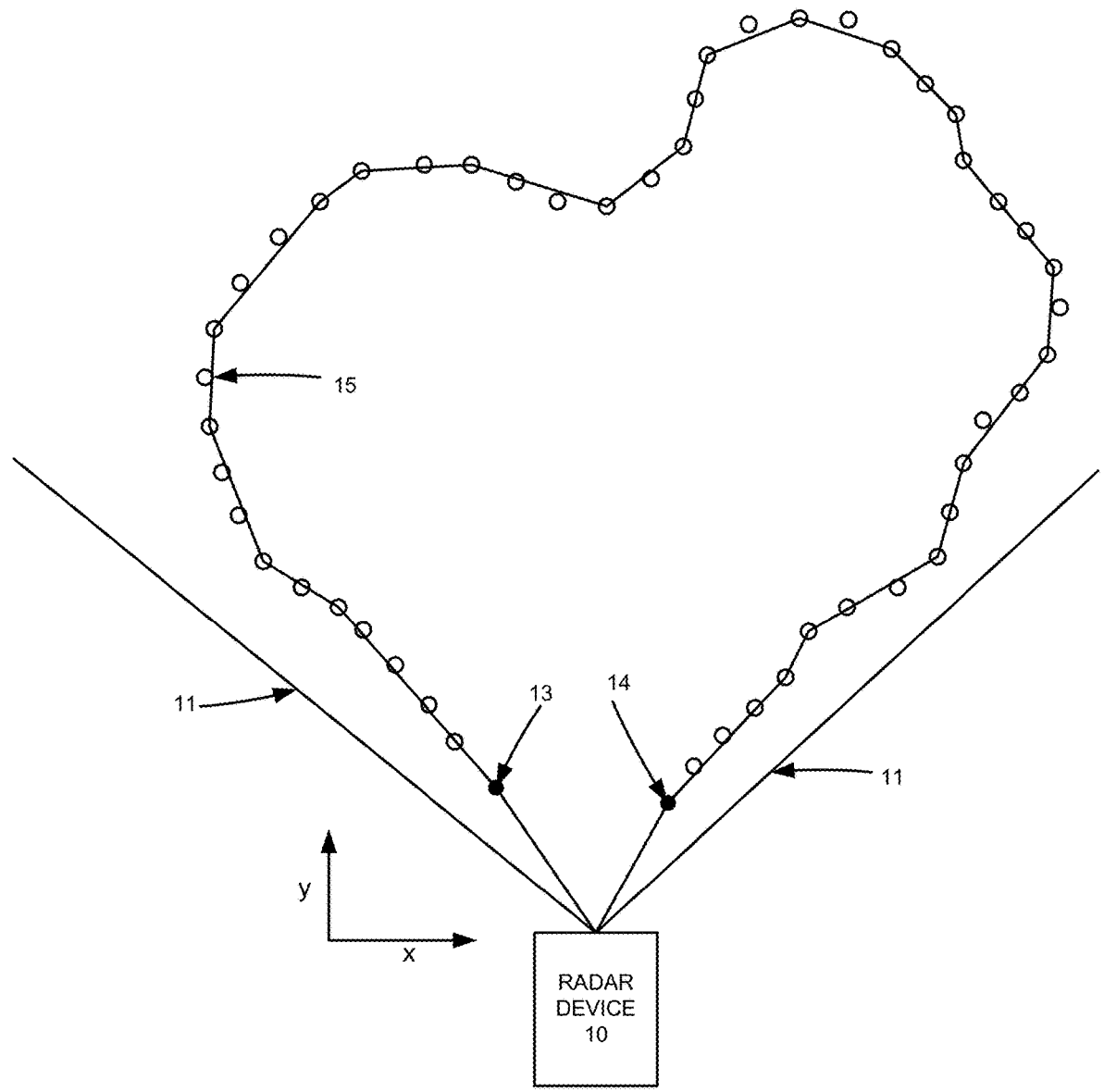
FIG. 3 is a schematic diagram illustrating an example of the determined locations associated with the first body for defining the virtual fence and the determined polygon.

During installation of the radar system, the technician will switch the radar to a calibration or configuration mode for the defining of a virtual fence. The technician or an assistant 12 will then walk around the surface to define the region of interest as locations for a virtual fence. As shown in FIG. 3, the radar tracks the path of the person 12 as the person walks and creates a trajectory in the 2D plane. Each measurement 15 of the location of the person is detected from a start location 13 to a stop location 14, where the tracking is started and stopped respectively.

The person is tracked using a tracking module in a processor or device that is in communication with the radar system as will be described hereinafter with reference to FIGS. 6 and 7. The tracking module can use any known tracking algorithm. For example, the radar may generate a plurality of detection measurements (e.g., up to 100 measurements, or in other embodiments hundreds of measurements) for a given frame in which the technician completes the walk. Each measurement can be taken a defined time interval apart such as 0.5, 1, 2 or 5 seconds apart. Each detection measurement may include a plurality of parameters in response to a received radar above a given threshold. The parameters for each measurement 15 may for example include an x and y coordinate (and z coordinate for a 3D radar system, as will be described for other embodiments hereinafter), a peak reflection value, and a doppler value corresponding to the source of the received radar signal.

The data can then be processed using a clustering algorithm to group the measurements into one or more measurement clusters corresponding to a respective one or more targets. An association block may then associate a given cluster with a given previously measured target. A Kalman filter may then be used to determine the next position of the target based on the corresponding cluster of measurements and the prediction of the next position based on the previous position and other information e.g., the previous velocity.

From the radar measurements an RCS of an object represented by a cluster of measurement points can be estimated by summing the RCS estimates of the each of the measurement points in the cluster.

In some embodiments, this RCS estimate may be used to classify the target for example for classification as a human target it may be determined whether the RCS is within a particular range potentially relevant to humans for the frequency of the radar, as the RCS of a target is frequency dependent. For 77 GHz for example, from empirical measurements, the RCS (which is frequency dependent) of an average human may be taken to be in the order of 0.5 $m^2$, or more specifically in a range between 0.1 and 0.7 $m^2$, with the value in this range for a specific person depending on the person and their orientation with respect to the radar. The RCS of human in the 57-64 GHz spectrum is similar to the 77 GHz RCS—i.e., 0.1 and 0.7 $m^2$. Optionally the person may carry a radar reflector, e.g., a metal corner reflector, which in some embodiments is held or worn with its measurement centre at a known height above the surface (e.g., known to within 20% or in more precise embodiments to within 10%). The corner reflector may advantageously be sized to be held within a person's hand. The sue of a radar reflector can increase the estimated RCS of the object (the person in combination with the radar reflector) by increasing the signal to noise ratio of measurements from the object, which may assist more precise tracking of the object.

The tracker outputs values of location, velocity and RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g., cartesian or polar dimensions), depending on the embodiment.

In the next stage, the radar takes the trajectory (which typically includes ~hundreds of points 15) and approximates it to a polygon with smaller set of points.

For example, given a trajectory in a 3D space $\{x_1, y_1, z_1, \ldots, x_N, y_N, z_N\}$, one option is to ignore the Z-component, as is done in this embodiment, and look only at the 2D X, Y components, since the region of interest is defined by a 2D area (since the surface of surface of the interest is approximated to be lying in a plane). The algorithm iterates through the N points and keeps only the points that are most useful in defining the trajectory (e.g., because those points identify where there are changes in the trajectory), until only predefined minimal number of points left, which define the polygon.

Example algorithm steps:
1. Initialize importance vector of all nodes in zeros.
2. Run through all nodes and compute their importance, where:

$$\text{Importance (vertex}_k) = \left| \arccos\left( \frac{\text{node}_{k-1}^T \cdot \text{node}_{k+1}}{\text{length (vertex}_{k-1}) \cdot \text{length(vertex}_{k+1})} \right) \right| \cdot \frac{\text{length (vertex}_{k-1})}{\text{length(vertex}_{k+1})}$$

Where $\text{node}_k = (x_k, y_k)^T$; and
T represents a transposition operation.

3. Based on the computed importance, remove the least important vertex, for example a predefined percentage of vertices. Nodes with larger angles to their neighbors and with longer edges give larger importance values so are less likely to be removed.
4. Repeat step 2 until a minimal number of nodes achieved. For example, in some embodiments, the step 2 is repeated until there are 30 points, which has been found by the inventors to be sufficient for representing a reasonable polygon. In other embodiments, fewer or greater nodes may be used.

This polygon, as defined by the final set of nodes, is stored in the radar memory and defines a boundary of the region of interest for the radar system. This polygon is illustrated by the lines in FIG. 3.

In an event that the person does not trace a closed loop, the processing system can close the loop, e.g., by tracing the ends of the tracked path 13 and 14 back to the (0,0) radar device coordinate as shown in FIG. 3.

Figure 4:
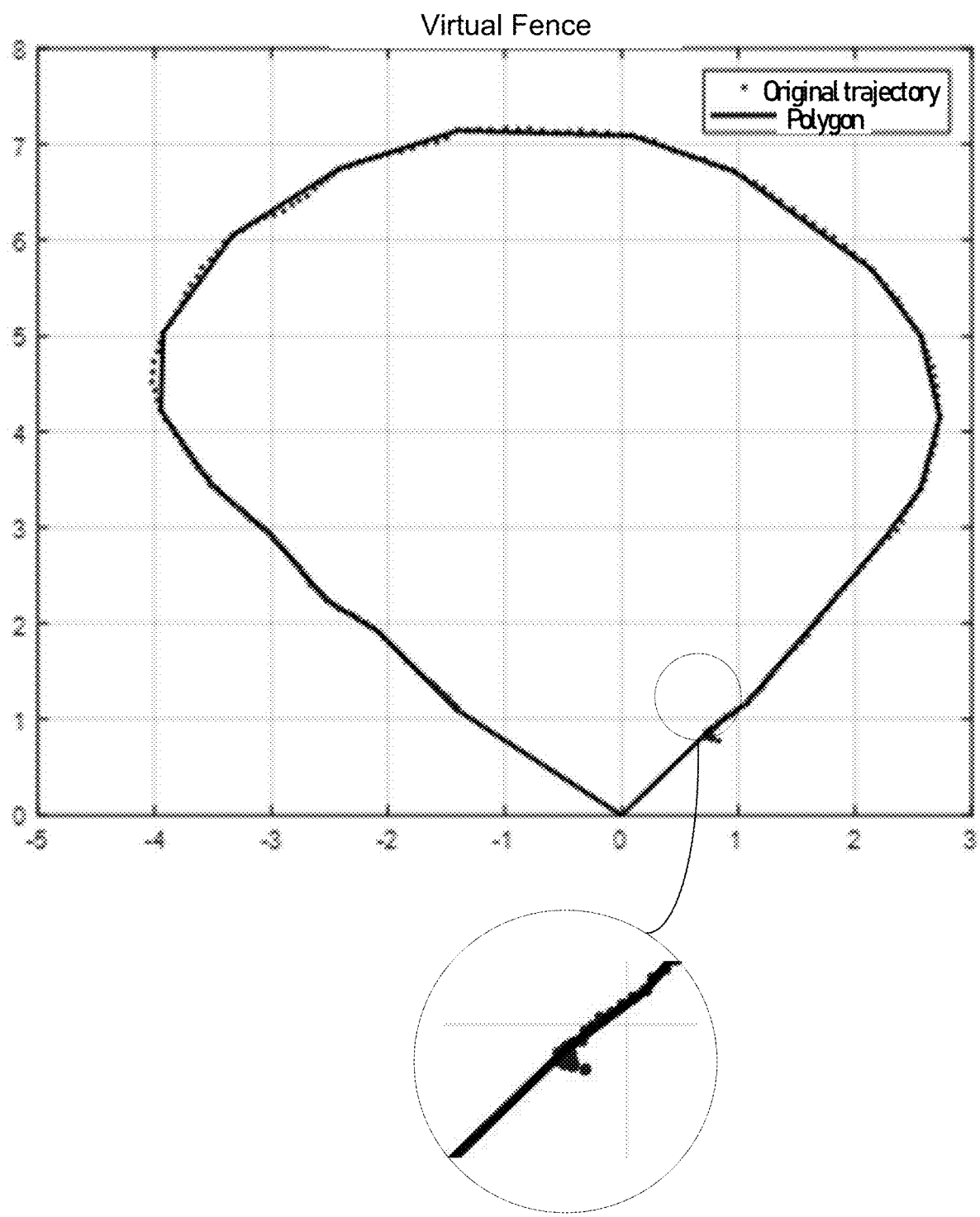
FIG. 4 is a schematic diagram plotting the data for another, more detailed example of the determined locations associated with the first body for defining the virtual fence and the determined polygon.

FIG. 4 is a schematic diagram plotting the data for the determined locations associated with the first body for defining the virtual fence and the determined polygon in more detail, albeit as a different example to FIG. 3. The exploded area shows a start region where there are a cluster of redundant measurements that are processed to reduce the data defining the virtual fence as illustrated by the polygon in FIG. 4.

The polygon defines the virtual fence. To simplify the setting of the virtual fence, in some embodiments, the user performs the above procedure in a controlled environment in which the person who walks performs the walk is the only moving object, thus only one target is identified and tracked by the radar.

Figure 5:
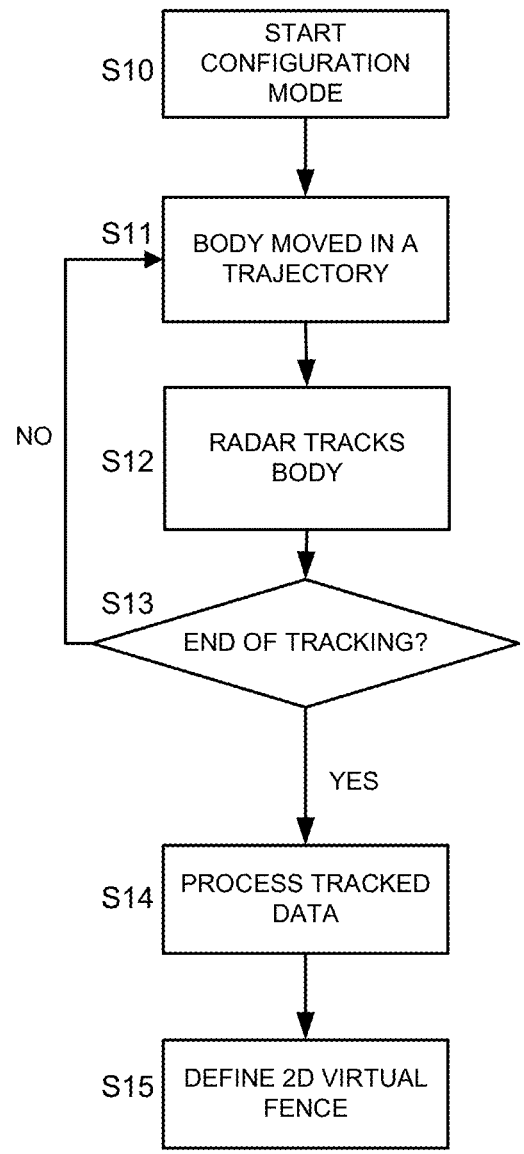
FIG. 5 is a flow diagram illustrating steps of an example configuration mode.

FIG. 5 is a flow diagram illustrating steps of the operation of an example configuration mode.

In step S10 the configuration mode is initiated and in step S11 the body, such as a human, moves in a trajectory to define a virtual fence. In step S12 the radar tracks the body until the operator stops the tracking in step S13. In step S14 the tracked data measurements are processed, such as using the algorithm described above, to define a 2D virtual fence in step S15.

Figure 6:
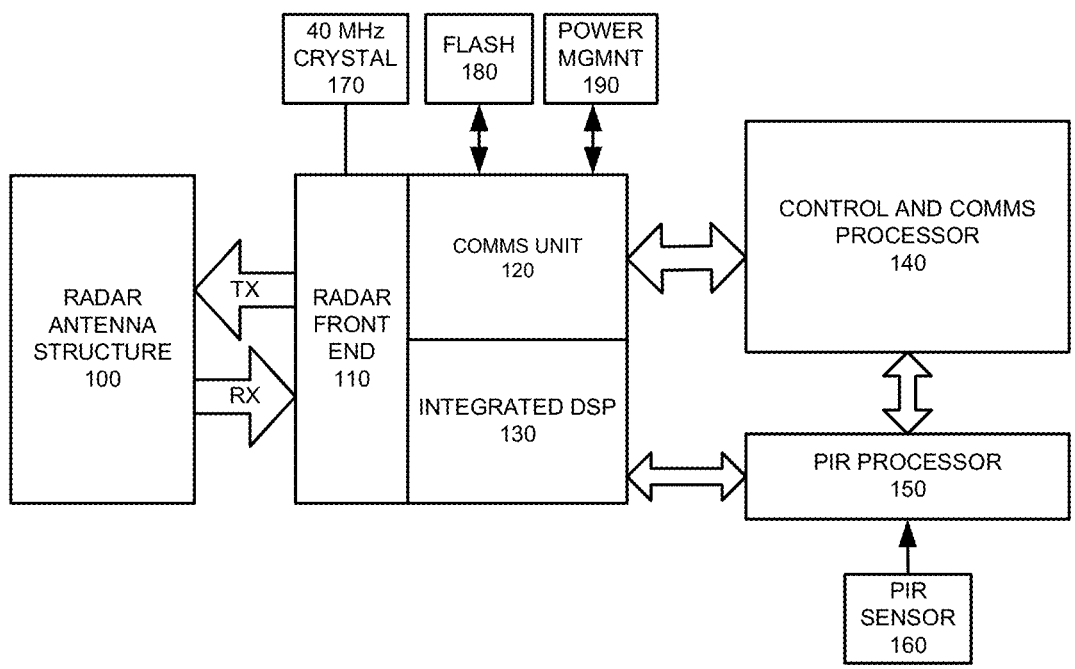
FIG. 6 is a schematic diagram of an example system.

FIG. 6 is a schematic diagram of an example system for defining a virtual fence and for detecting a location of a body relative to the virtual fence. The system can comprise distributed components or it can comprise components provided in a single device.

An exemplary radar antenna configuration 100 (i.e., a radar antenna structure) is connected to a radar front end 110 for the exchange of signals for the transmission and reception of radar signals. The radar signals are transmitted as electromagnetic waves from a plurality of antennas of the radar antenna configuration 100 and received by another plurality of antennas of the radar antenna configuration 100 as reflected electromagnetic waves. The radar front end 110 is provided with a 10 MHz crystal 170. A comms unit 120 is connected to or integrated with the radar front end 110, a separate memory (which in the illustrated embodiments is a flash memory 180), and a power management unit 190 (in some embodiments, battery powered) are connected to the comms unit 120. An integrated digital signal processing unit (DSP) 130 is provided for the processing of the received radar signals and is interfaced to the comms unit 120. A control and comms processor 140 is provided to communicate with the comms unit 120. The control and comms processor 140 may be powered from the power management unit 190 and may be configured by code in the separate memory 180 or another separate memory or integrated memory. A passive infrared (PIR) processor 150 is provided to receive and process infrared (IR) signals from a PIR sensor 160. The PIR sensor may be used to detect motion and may advantageously do so with a relatively low consumption of power compared with other common motion sensors, but in other embodiments in addition to or instead of a PIR, one or more other motion sensors may be used. The PIR processor is connected to the integrated DSP 130 for the triggering of the operation of the integrated DSP 130 and it can also be connected to the control and comms processor 140 to communicate the PIR sensor 160 detection to the control and comms processor 140. The system shown in FIG. 6 is in some embodiment a battery powered device. In such battery embodiments, it may be especially important to keep power consumption low. In one or more embodiments, the radar front end 110, the comms unit 120 and the integrated DSP can be integrated in a chip. The chip may use millimeter wave (mmWave) sensing technology. The radar is in some embodiments continuous-wave radar, such as frequency modulated continuous wave (FMCW) technology. Such a chip with such technology may be, for example, Texas Instruments Inc. part number IWR1642 for 2D radar and IWR1443 for 3D radar. The radar may operate in microwave frequencies, e.g., in some embodiments a carrier wave in the range of 1-100 GHz (76-81 Ghz or 57-64 GHz in some embodiments), and/or radio waves in the 300 MHz to 300 GHz range. In some embodiments, the radar has a bandwidth of at least 1 GHz.

The radar device may then communicate an alert (e.g., indicating a potential intruder), and optionally their location coordinates, a direction of their movement of their movement (e.g., are they moving towards or away from the virtual fence). The communication is in some embodiments, a wireless communication via control and comms processor 140, to a control panel of a monitoring system, which may include other peripheral monitoring devices, e.g., PIR motion sensors, smoke detectors, etc. The communication may also include a classification defining what the intruding object is determined to be. In some embodiments the radar may further communicate the output of the tracker so that a person monitoring the area can see a visual spatial representation of the objects movements in the area defined by and relative to the virtual fence. The control panel may communicate the information to a remote server so that the person monitoring the site may be remotely located.

The PIR sensor can trigger control of the power state of the chip. After the setup phase in which the surface of the area being monitored is determined by the radar chip, the PIR processor 150 can switch the power/activity state of the radar chip to a low power or disabled or off state, and use the PIR sensor 160 (or a plurality of PIR sensors) to monitor a PIR region of interest that includes the area monitored by the radar, or at least the region within the virtual fence. When movement is detected by the PIR sensor 160, it can switch the chip into an active state. The chip may return to the lower/no power state based on determining that some predefined condition, e.g., representative of a low activity and/or low threat state, has been reached. For example, the predefined condition may be ceasing, or a period of an absence, of motion detected by the PIR sensor, an absence of a radar tracked object in the area being monitored, a command from the control panel or any combination thereof.

Figure 7:
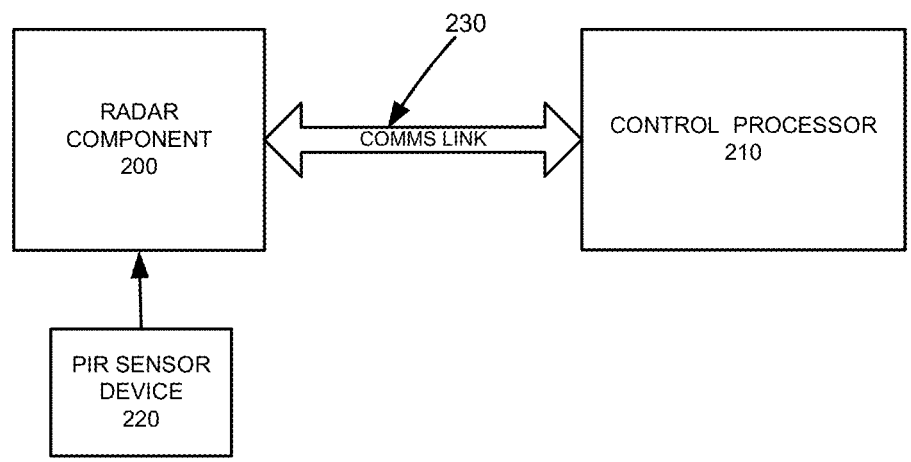
FIG. 7 is a schematic diagram of an alternative example system.

FIG. 7 is a schematic diagram of an alternative example system in which the control processor 210 is separate to the radar component 200 and the connected PIR sensor device 220. The radar component 200 may include many of the same components as in the embodiment of FIG. 6, e.g., it may include the radar antenna configuration 100, radar front end 110, comms unit 120, DSP 130, oscillator 170, flash memory 180 and power management unit 190. A comms link 230 is provided between the control processor 210 and the radar component 200. The comms link 230 can be wireless or a wired link and it can be any form of communication link, such as a network link over a local area network, a wide area network or the internet. Hence, this embodiment represents an embodiment wherein the processing system is remote from the radar antenna device 10. The processing of the radar signals for the configuration and monitoring modes of operation are performed remotely by the transmission of signals over the comms link 230. In any case, the monitoring system may comprise a control panel that acts as a hub for a plurality of peripheral devices of the monitoring system, and which may for example include control processor 210 or communicate, in some embodiments wirelessly, with control and comms processor 140.

The operation of the system in the monitoring mode will now be described.

Once the virtual fence has been defined, the processing system is then changed to monitoring mode, in which any objects that are inside, outside, enter or leave the area defined by the virtual fence are identified may be identified with reference to the polygon. This may be achieved for example using any known algorithm, but in one example, a projection is calculated in any one direction from the measured coordinate of the identified object, for example as shown in the FIG. 8.

Figure 8:
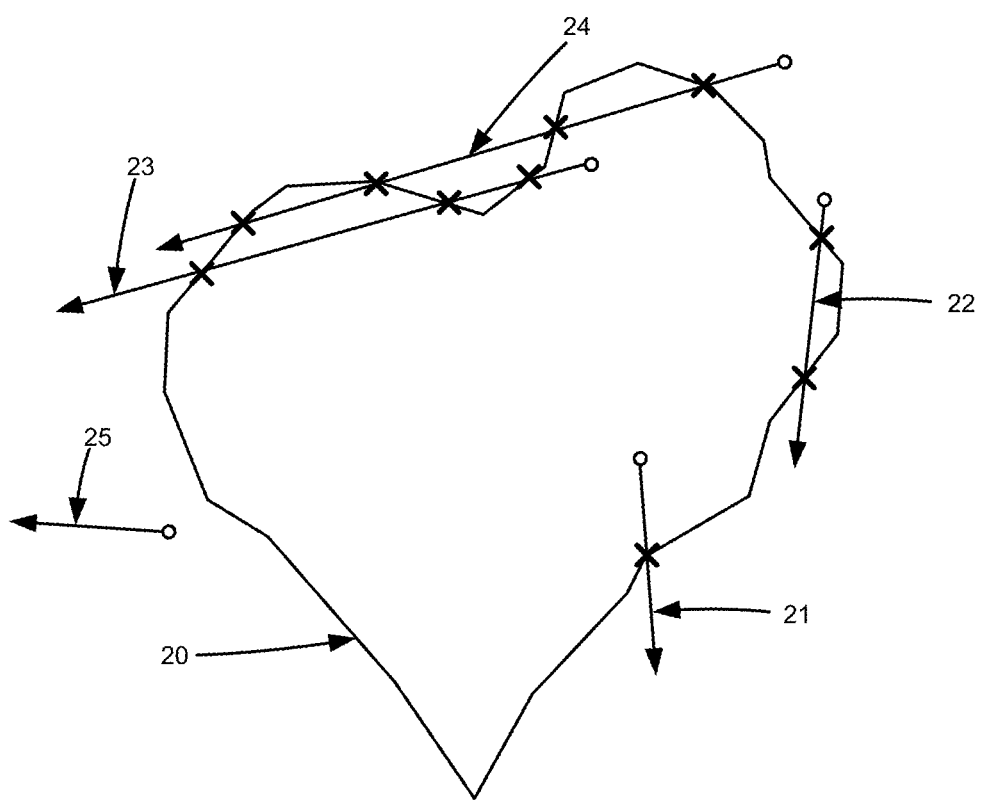
FIG. 8 is a schematic diagram illustrating one example process for the determination of whether a detected location is inside or outside a virtual fence.

FIG. 8 is a schematic diagram illustrating one example process for the determination of whether a detected location is inside or outside a virtual fence in which five example location determining projections are illustrated. The projections can be a projection in any direction from the detected location to infinity.

The projection 25 from its associated detected location does not cross the virtual fence. The projection 24 from its associated detected location crosses the virtual fence 4 times since it crosses a region of inflection from a location outside the virtual fence. The projection 23 from its associated detected location crosses the virtual fence 3 times since it crosses a region of inflection from a location inside the virtual fence. The projection 22 from its associated detected location crosses the virtual fence 2 times from a location outside the virtual fence. The projection 21 from its associated detected location crosses the virtual fence only once from a location inside the virtual fence.

If the projection crosses a boundary the virtual fence (polygon) an even or zero number of times its associated location is determined to be outside the virtual fence, whereas if the projection crosses a boundary of the virtual fence an odd number of times, its associated location is determined to be inside the virtual fence.

In an event that the object is determined to be inside the virtual fence such a determination may be used by the processing system of the radar device to issue an alert or other notification. Additionally, or alternatively, further classification may be conducted on the object, e.g., to provide additional information with a notification/alert or to determine whether to issue a notification or alert. For example, if the classification defines the object as potentially human, e.g., based on the expected radar cross section (RCS) range for humans, optionally in combination with other data. Optionally, the processing system might be configured to not issue an alert, or to issue a different kind of alert/different notification, in an event that the target is not classified as a human.

Figure 9:
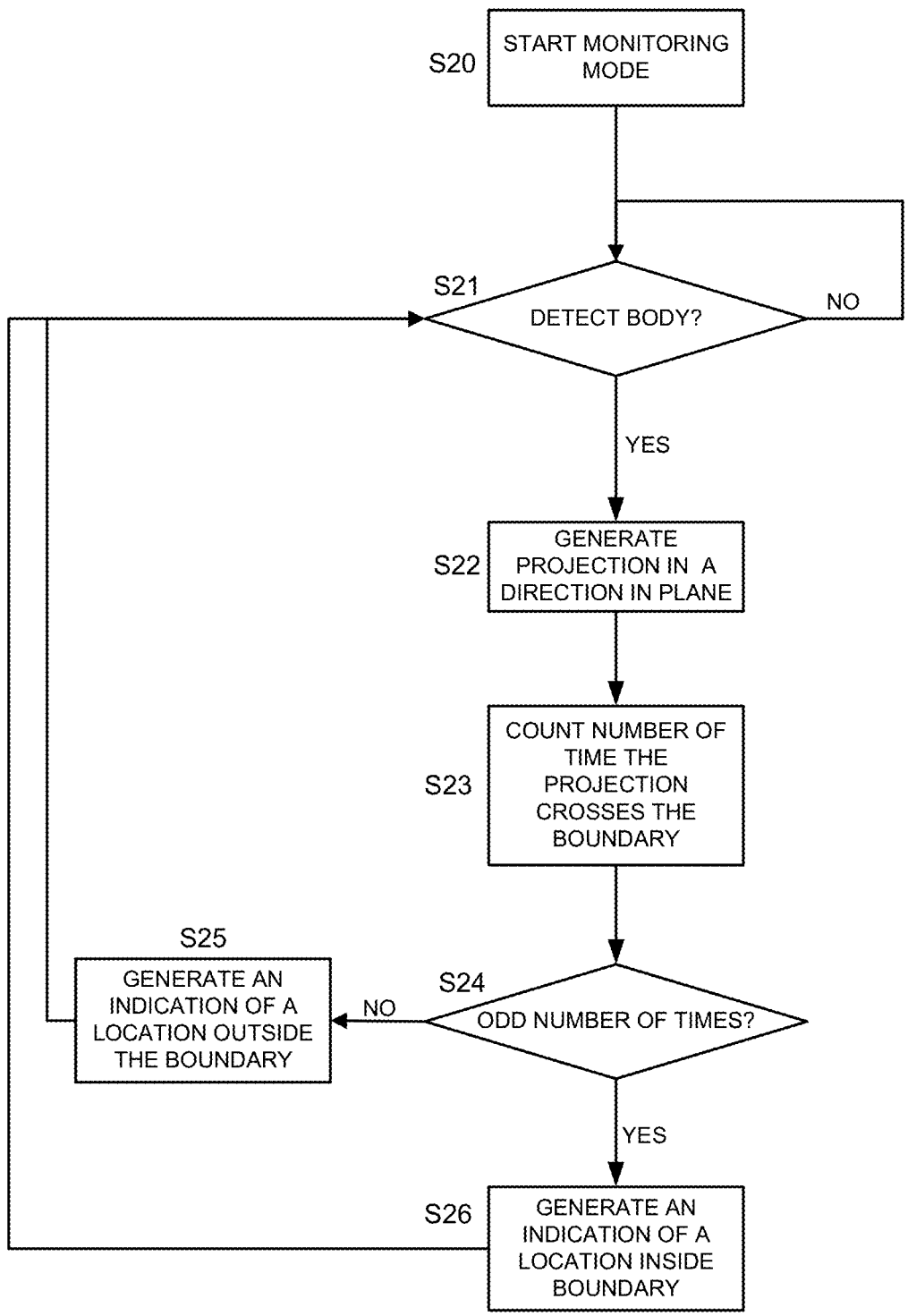
FIG. 9 is a flow diagram illustrating steps of an example monitoring mode.

FIG. 9 is a flow diagram illustrating steps of an example monitoring mode in which, in step S20 the monitoring mode is started. In step S21 the process awaits the detection of a body by the radar. In step S22 the detected location has a projection generated from it in any direction in the 2D plane of the virtual fence and in step S23 the number of times the projection crosses the boundary is counted. In step S24 it is determined whether the number of times is odd and if so, in step S25 it is determined that the location is outside the boundary of the virtual fence and optionally an indication of this can be generated and the process returns to step S21. If the number of times the boundary of the virtual fence is crossed is not odd i.e., even or zero, in step S26 it is determined that the location is inside the boundary of the virtual fence and optionally an indication of this can be generated and the process returns to step S21.

In the discussion above with regard to FIGS. 1 to 5, 8 and 9 the radar used is a 2D radar and no z component is utilized. The virtual fence is confined to a 2D plane roughly parallel to the surface that is in the region of interest and the monitoring is performed of the body in the same 2D plane.

The following embodiments will now consider the use of 3D radar.

Figure 10:
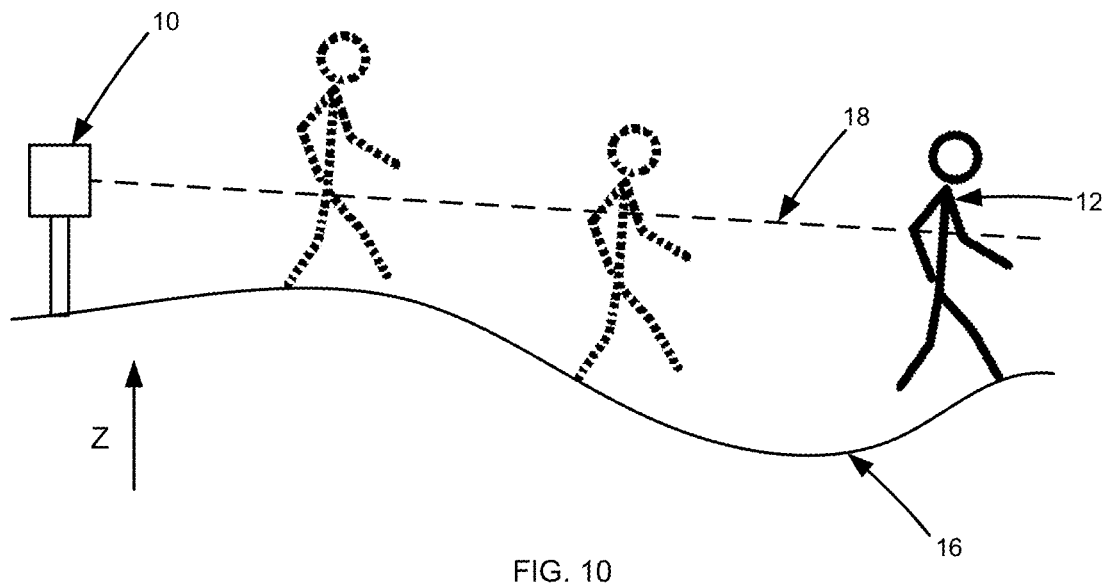
FIG. 10 is a schematic diagram illustrating an exemplary method of defining a 2D virtual fence when the surface is undulating.

FIG. 10 is a schematic diagram illustrating a method of defining a 2D virtual fence when the surface is undulating. In this embodiment the virtual fence 18 is planar in the x and y direction but is tilted in the z direction to try to follow the average of the contour 16 of the surface. It can be seen in FIG. 10 that when the person 12 walks around the path on the surface, heights associated with various locations on their body, and therefore their measurement centre, relative to the plane of the virtual fence varies.

Figure 11:
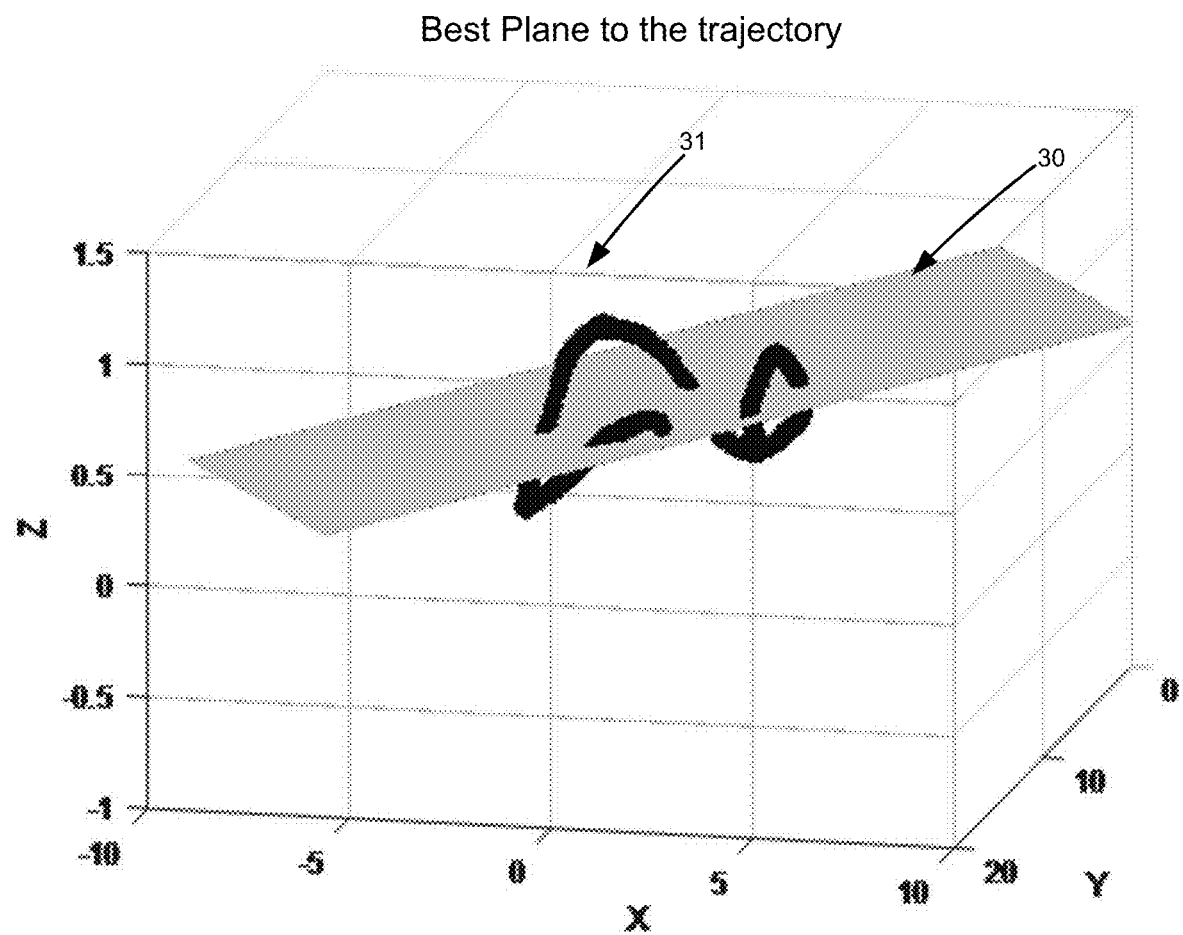
FIG. 11 is a schematic diagram of data defining 3D detected locations for a first body to define a virtual fence and a best plane trajectory for a best fit 2D plane for the projection of the 3D data to define a 2D virtual fence.

FIG. 11 is a schematic diagram of data defining 3D detected locations for a first body to define a virtual fence and a best plane trajectory for a best fit 2D plane for the projection of the 3D data to define a 2D virtual fence.

In this embodiment, the clustering being performed in 3D rather than 2D, so the tracked trajectory in the configuration mode includes a z component to provide a 3D curve 31. Hence, in this embodiment, the contours or undulations of the surface are approximated by a 2D plane on which the 2D virtual fence lies.

A plane of best fit 30 is defined and the polygon defining the virtual fence may be determined such that it lies on the plane 30 by projecting (or in any other way mapping) the points in the z direction to the plane 30 or in the direction perpendicular to the plane of best fit. The plane of best fit may for example by determined to least-squares. Optionally a rotation matrix may be used to rotate the coordinate system such that the plane of best fit lies in 2 dimensions of the rotated coordinate system. One advantage of measuring in 3D is that it enables an adaptation to misalignments. Such misalignments may be for example, if the topography of the region of interest is a known orientation (e.g., horizontal) but the radar device 10 is aligned such that its x-y plane is not horizontal, or if the radar device has a horizontal x-y plane but the region of topography of the region of interest is sloped. Optionally, a plane of best fit of the topography may, for example, be rotated to be in the x-y plane of the radar, thereby removing a z-component from the virtual fence.

In some applications of the invention the area being monitored by the radar is a flat surface (or very close to a flat plane), whether it be horizontal or tilted. In such a case, the plane of best fit may be used as a reasonable estimation of the surface shape in all of the monitored area. The processing system determines the height metric (e.g. a height of a measurement centre) associated with of an object of interest (such as a moving object of interest having an RCS within a predefined range, or at least above a predefined minimum) within the virtual fence based on a distance (e.g. a perpendicular or vertical distance) between the plane and a coordinate associated with the radar signal from the object of interest. Thus, it can be determined, not only whether an object has entered the region defined by virtual fence, but also an indication of the height metric associated with the object. The height metric may be used to assist in identifying a potential threat in the monitored area. For example, based on a radar signal being reflected from a height outside a certain range, it may be concluded that the radar signal is unlikely to correspond to an adult human intruder. While the height metric associated with the object may have an error if the surface within the virtual fence does not lie in a plane, this may be mitigated in some embodiment by operating the system in an environment in which the surface does lie in a plane or has only minor/insignificant undulations out of the plane.

Figure 12:
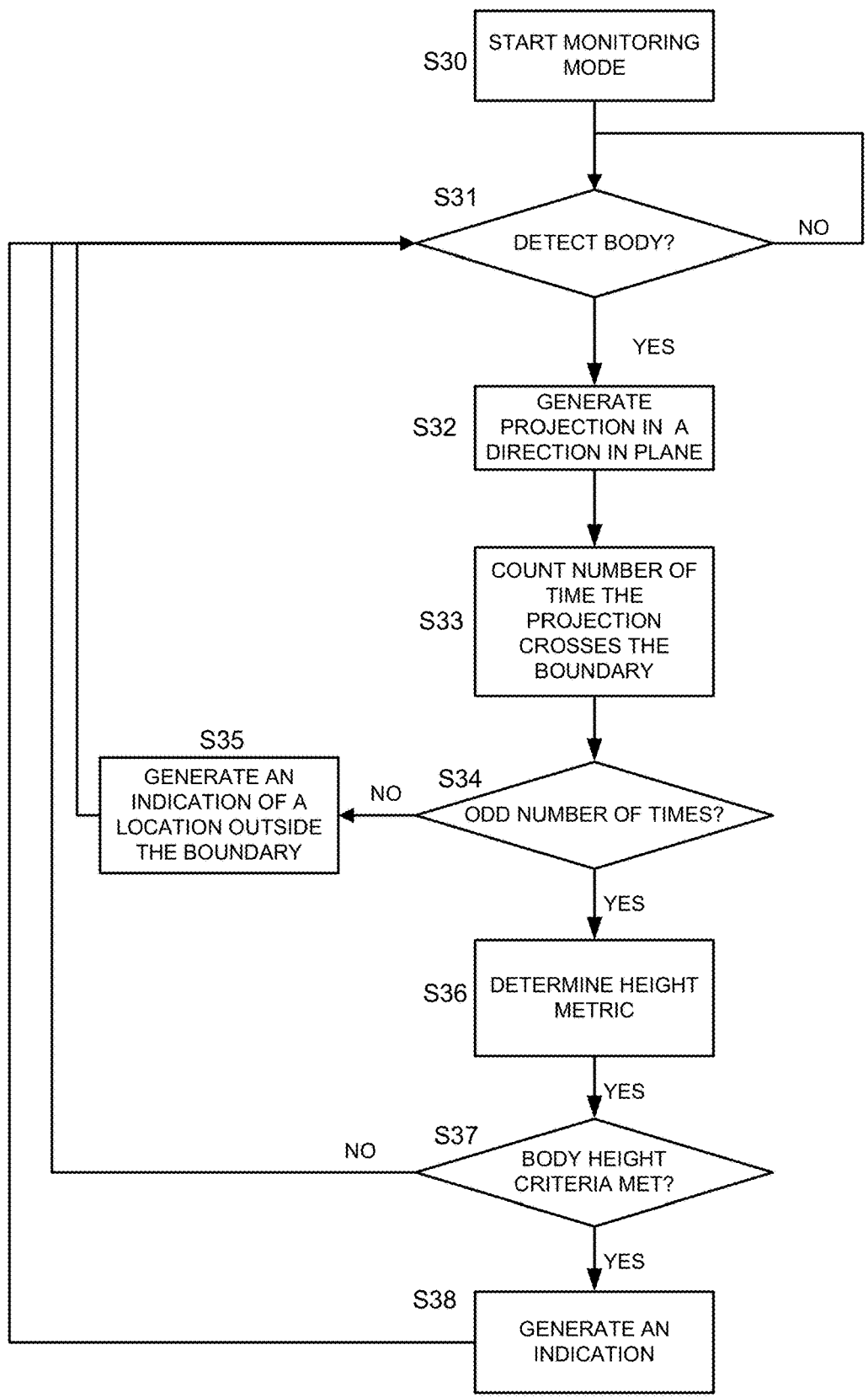
FIG. 12 is a flow diagram illustrating steps of an example monitoring mode including detection of a height metric associated with a body, using the 2D virtual fence of FIG. 11.

FIG. 12 is a flow diagram illustrating steps of an example monitoring mode including detection of a height metric associated with a body using the 2D virtual fence of FIG. 11. In the examples that follow the height metric is a height of the body's measurement centre above a surface in a region of interest.

In step S30 the monitoring mode is started. In step S31 the process awaits the detection of a body by the radar. In step S32 the detected location has a projection generated from it in any direction in the 2D plane of the virtual fence and in step S33 the number of times the projection crosses the boundary is counted. In step S34 it is determined whether the number of times is odd and if so, in step S35 it is determined that the location is outside the boundary of the virtual fence and optionally an indication of this can be generated and the process returns to step S31. If the number of times the boundary of the virtual fence is crossed is not odd i.e., even or zero, this method differs from the 2D radar method of FIG. 9 in that in step S36, a height metric associated with the body is determined. For example, the determined height may be an elevation of measurement centre of the body. The height may be determined for example by determining the location of the measurement centre, from a radar point cluster associated with the object, and then determining a distance between that location and a plane of best fit, which for a planar surface is a close approximation to the actual surface. The distance may for example be a vertical distance (along the z axis) or orthogonal distance from the plane to the location of the measurement centre of the object.

In step S37, the height metric is used to determine whether the height of the detection meets a criterion, for example if it less than a threshold, or it is within a predefined range. If it does not satisfy the criteria, the detection may optionally be ignored, and the process returns to step S31. If in step S37 it is determined that the determined height meets the criteria, in step S38 an indication may be generated, indicating that the location associated with the object is inside the boundary of the virtual fence and satisfies the height criteria. The indication may include a coordinate of the body with respect to the surface of the region of interest, and may also include the determined height metric. In other embodiments, the indication may be generated regardless of whether such a height criterion is met. In any case, the processing system may continue to detect the same body (or track it) or detect/track other bodies in the monitored space and repeat the analysis, e.g., by returning to step S31. In an alternative embodiment, step S37 may be after step S31 and before step S33.

Hence, in either embodiment, the criteria may comprise a height range or a threshold height i.e., is the height above or below a threshold, for example a height less some a predefined magnitude. The use of the criteria assists in avoiding erroneous detections from objects that are not the desired object to be detected. However, in another embodiment the height metric not calculated and/or is ignored.

An exemplary use of a 3D virtual fence will now be described using 3D radar.

Figure 13:
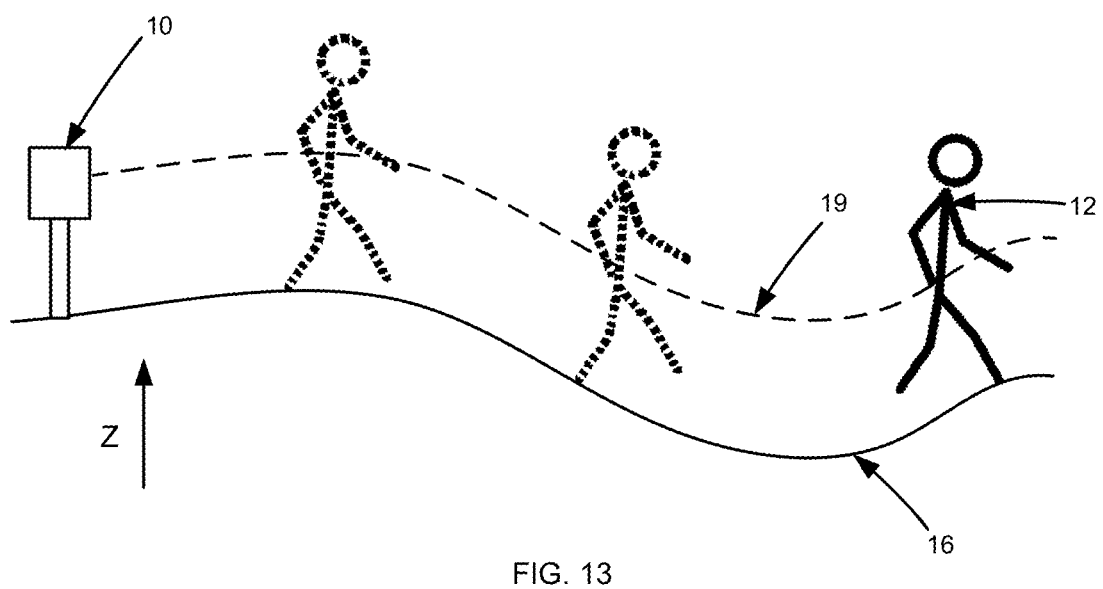
FIG. 13 is a schematic diagram illustrating an exemplary method of defining a 3D virtual fence when the surface is undulating.

FIG. 13 is a schematic diagram illustrating a method of defining a 3D virtual fence when the surface is undulating. In this embodiment the virtual fence 19 is not planar in the x and y direction but is instead a 3D plane that follows the contour 16 of the surface. It can be seen in FIG. 12 that when the person 12 walks around the path on the surface the height of their measurement centre relative to the 3D plane of the virtual fence is substantially constant.

Figure 14:
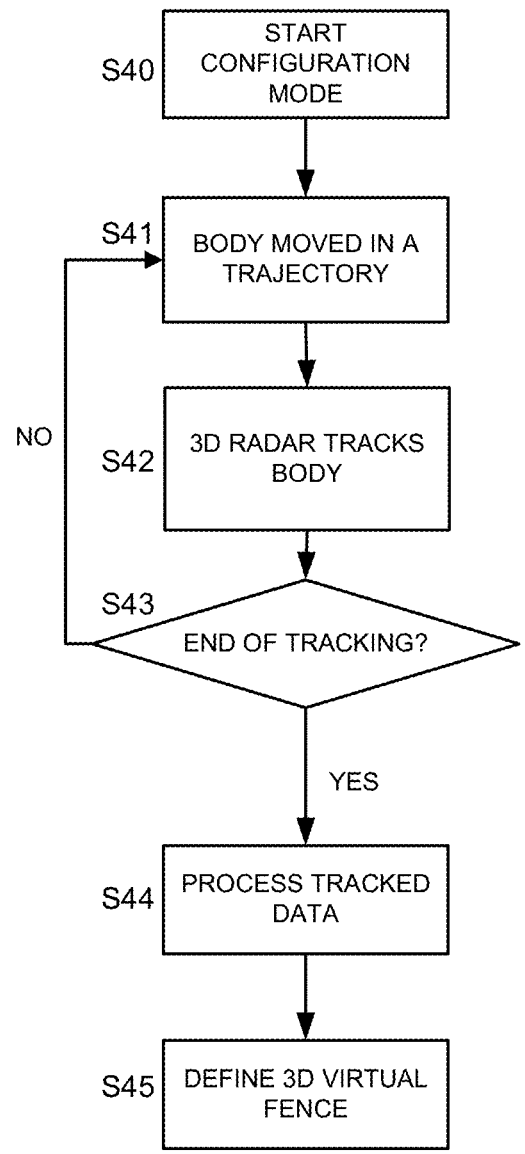
FIG. 14 is a flow diagram illustrating steps of an example configuration mode using 3D radar.

FIG. 14 is a flow diagram illustrating steps of an example configuration mode using 3D radar.

In step S40 the configuration mode is initiated and in step S41 the body, such as a human, moves in a trajectory to define a 3D virtual fence. In step S42 the 3D radar tracks the body until the operator stops the tracking in step S43. In step S44 the tracked data measurements are processed, to define a 3D virtual fence in step S45. The processing of the tracked data can be performed using a same algorithm to that has been described herein, and the polygon also be defined using the method described herein. However, the trajectory of the virtual fence itself is not confined to the plane that contains the polygon, but rather includes a true 3D mapping of the virtual fence, including any undulations in the surface along the fence. Thus, a 3D topography at the virtual fence may be determined.

Figure 15:
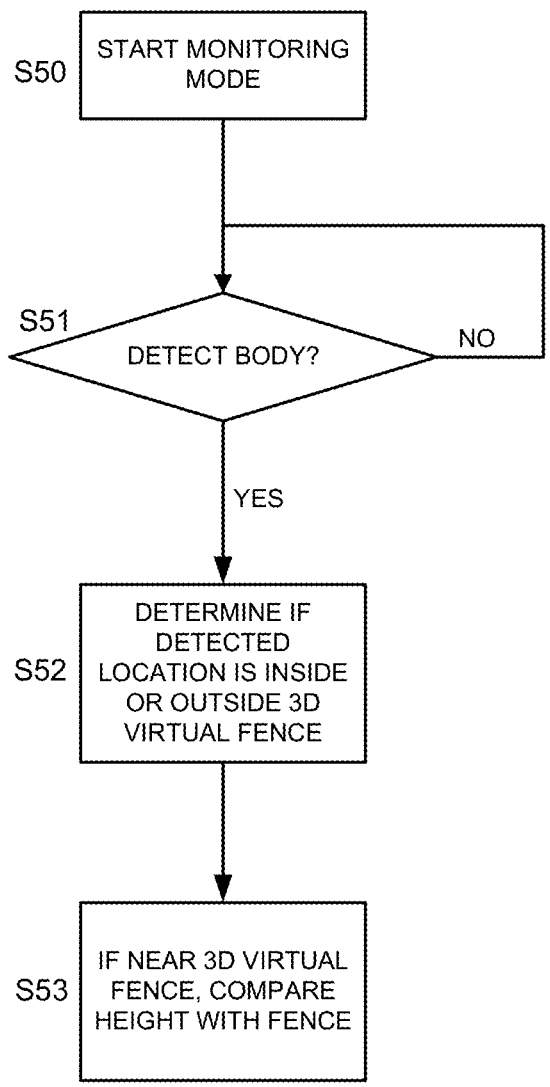
FIG. 15 is a flow diagram of an example monitoring mode including detection, of associated with a body, using the 3D virtual fence of FIG. 14.

FIG. 15 is a flow diagram of an example monitoring mode including detection of a height associated with a body (e.g., an elevation of the body's radar measurement centre) using the 3D virtual fence of FIG. 14. In step S50 the monitoring mode is started and in step S51 the process awaits the detection of a body by the 3D radar. In step S52 it is determined if the detected location is inside or outside the virtual fence using the 2D polygon using the projection method described above in the plane of the polygon to perform steps S32 to S35. At step S53, when an object is determined to be at the virtual fence (to within some predefined distance, e.g., 1 meter), a height associated with an object is approximated by comparing the location of a coordinate that is representative of a height associated with the object with the location of the 3D virtual fence. For example, the height may be determined as a vertical (z) distance from the coordinate to the virtual fence at the nearest x y coordinate (e.g., nearest by least squares).

Although the embodiments described above, in the configuration mode the object being for with locations are identified is a human, the object can alternatively be or comprise a radar reflector that can be moved along, or to different locations along, the boundary path. Such a radar reflector may be carried by another reflective object, such as a human, animal or vehicle. From the radar signals the carrying object and the carried object may be treated as a single or object, or in some embodiments a more precise locating can be achieved by identifying and treating the radar reflector as a distinct object, as the radar reflector may be smaller and provide a higher signal to noise ratio that the carrying object. The radar reflector(s) can be identified by having a known signature. For example, a known radar reflective signature can be provided by the size, shape and material of the radar reflector and/or by movement of the radar reflector, such as a tilting or rotating motion, to inherently change or modulate the radar cross section of the radar reflector.

Although the embodiments described above detect the location coordinates for the determination of the virtual fence using a single object that is tracked along a path defining the boundary, in one or more embodiments more than one first object can be used in the configuration mode. More than one moving object can be used to move about and identify locations of the boundary in one embodiment. In another embodiment, a plurality of first objects can be provided at static locations defining the boundary. The objects can be radar reflective or can carry a radar reflector such as discussed above. With this arrangement the locations that define the boundary may be identified while disregarding locations therebetween, which may be beneficial in applications where it is not possible or impractical move between the locations (for example if the locations are separated by a physical obstacle). However, it does require multiple reflective objects to be deployed at the required locations for the location determinations in the configuration mode.

By contrast, in other embodiments, the locations identified to determine coordinates for defining the virtual fence are identified from measurements of a single body, by tracking a person as they walk along the boundary or by tracking sequential events that can be performed by the person at various locations along the boundary. Such events may be radar recognizable actions, e.g., holding up a radar reflector directed to the radar device for a known period of time, or waving. Such embodiments can advantageously provide a configuration method that is especially simple to implement, and may be achieved with a single tool, and in some embodiments with no tools. Further, regardless of whether one or more radar reflectors are employed to define the virtual fence, the fence defining methods described here advantageously do not require any active devices other the single radar device 10, nor coordination or integration with other locating systems like GPS.

In some embodiments more than one virtual fence can be defined and used for monitoring. A first virtual fence at least can be defined using any of the methods described above and can be a 2D or 3D virtual fence. One or more further virtual fences can be defined either by automatic or manual modification of the first virtual fence or by the definition of one or more new virtual fences using the same method as for the first virtual fence.

Figure 16:
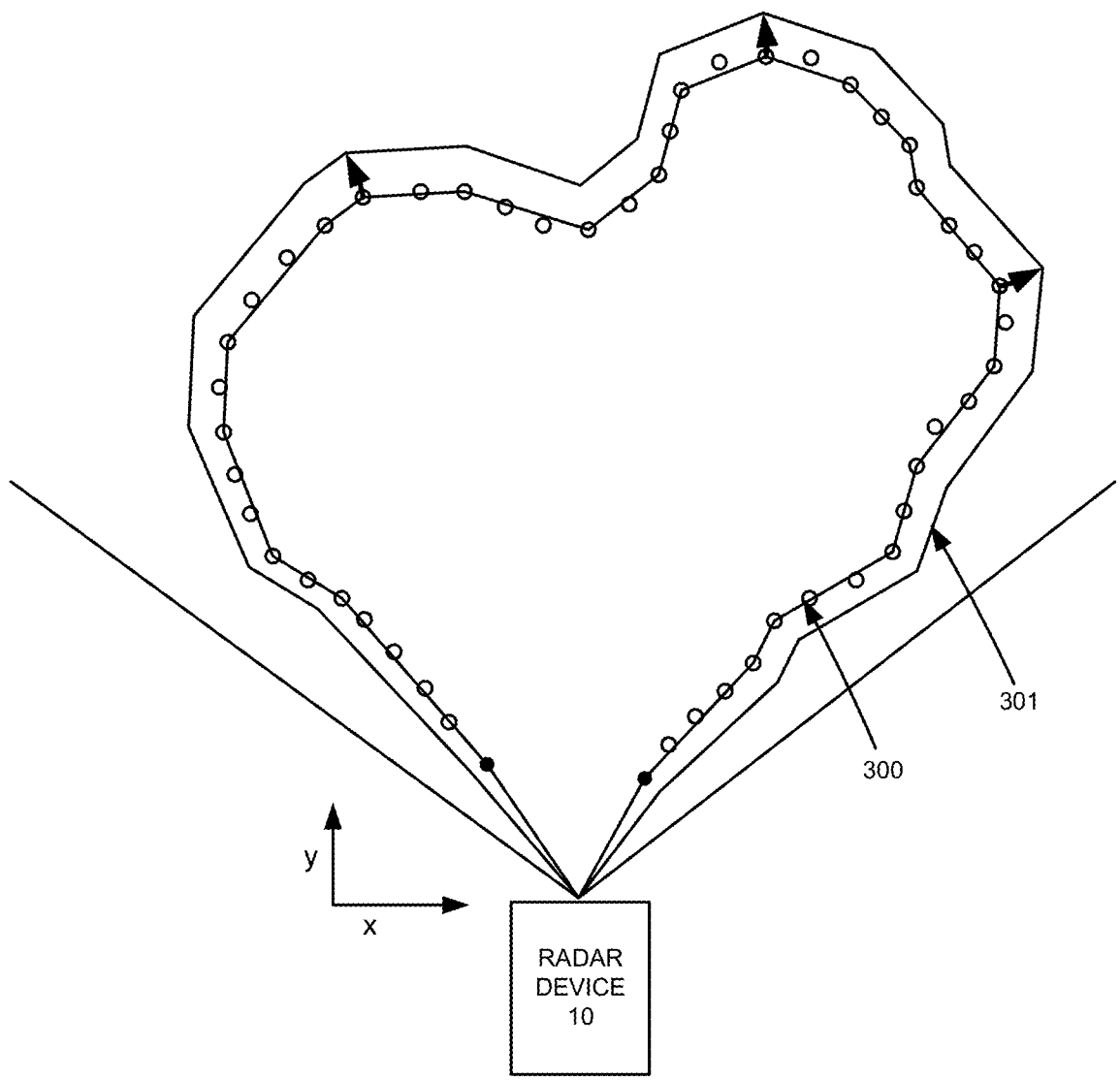
FIG. 16 is a schematic diagram illustrating a manual or automatic method of defining a second virtual fence based on a first virtual fence.

FIG. 16 is a schematic diagram illustrating a manual or automatic method of defining a second virtual fence 301 based on a first virtual fence 300. In this embodiment the second virtual fence 301 is an extrapolation of the first virtual fence 300, such that the first virtual fence 300 fits within the second virtual fence. The extrapolation can be performed automatically based on an extrapolation or scaling factor. For example, for each of the coordinate points defining the corners of the polygon, a direction pointing orthogonally away from the average of the two lines forming the corner angle i.e., at equal angles to each line can be determined and the coordinate point can be moved in that direction by a preset amount or a scaling factor. This is shown by the arrow in FIG. 16. The second virtual fence 301 can be used in place of the first virtual fence 300 or the two virtual fences can be used together.

In an alternative method, a user interface can be provided, such as a display by the processing system (e.g., the control and comms processor 140 in FIG. 6 or the control processor 210 in FIG. 7. The user interface can display the shape of the first virtual fence and provide selectable corners (coordinate points) and faces (extrapolations between coordinate points). A user can use the user interface to manually select and move coordinate points of the first virtual fence 300 to form the second virtual fence 301, e.g., by selecting and dragging the corners of the first virtual fence 300. This allows the user to define a new virtual fence of having different scaling factors in different directions. Also, the user can select to delete or add sides to the polygon to change the shape and not just the size of the second virtual fence. This may be required to allow a user to generate the second virtual fence 301 to take the environment into consideration, e.g., to manipulate the virtual fence 301 to avoid natural objects. The second virtual fence 301 can be used in place of the first virtual fence 300 or the two virtual fences can be used together.

As will be appreciated from these examples, the second virtual fence may be derived from the locations of the first body/bodies used to define the virtual fence or by another first body/bodies.

Although the virtual fences 300 and 301 are shown as being one within the other in the embodiment of FIG. 16, the virtual fences can be of any shape and any overlap or no overlap. Each of the virtual fences can be defined using the same method as for the first virtual fence and each can be monitored in the same manner Each virtual fence can have a different output associated with it, such as different warning messages or signals, which can be sent to the same device or to different devices. For example in some embodiments, in which a first virtual fence 300 is wholly encompassed within a second virtual fence 301, a first priority level of alert may be transmitted to a control panel that is located on-site when an object is newly detected in the area between the two fences 300 and 301, and a higher priority level of alert may be transmitted to the control panel, and optionally an additional device, when an object is newly detected in the area within the first virtual fence 300. The control panel may trigger an audible on-site alarm when receiving the higher priority, but not when receiving the first (lower) priority.

In the following embodiment, a more expansive 3D topographical map is determined using 3D radar, in which 3D topography is directly measured within a region of interest, e.g., within a virtual fence such as described above, which may be in addition to or instead of measuring the 3D topography at the virtual fence.

In one or more embodiments, mapping of the surface during the setup phase includes receiving radar data points within a monitored region or within any region of interest. The person who walked around the perimeter may for example walk over the area within the virtual fence or within any region of interest, at least over areas that diverge from the assumed flat contour of the surface. Alternatively, the person may walk all over the area, e.g., walking through the area along spaced lines (e.g., spaced by 1 meter) until all of the area is mapped.

In any case, since the radar data points received during setup are based on radar reflections from the person (or other object, such as a reflector they are holding), the data points will represent points that are some height above the actual surface height. The actual surface height may be determined by subtracting a vertical (z) component that is known the be produced by the object. For example, with the radar installed upright at a known height above an installation point on the surface, and the person standing at a location on the surface that at the same elevation as the installation point, the elevation of the signal from the person relative to the installation point of the surface may be determined and taken into account to determine actual the elevation of the surface at each radar data point recorded during the setup phase. Each radar "point" may be more precisely a calculated measurement centre of a cluster of measured reflections from different positions on the object.

Advantageously, by using the radar to both determine the topography of the area during setup and to identify objects of interest during use, the system enables an easy setup without requiring other sensing components/systems. Further, the height of an object's radar measurement centre within the virtual fence may be estimated for cases, even for cases in which a surface is tilted (with respect to the X-Y plane of the radar) and/or uneven.

Figure 17:
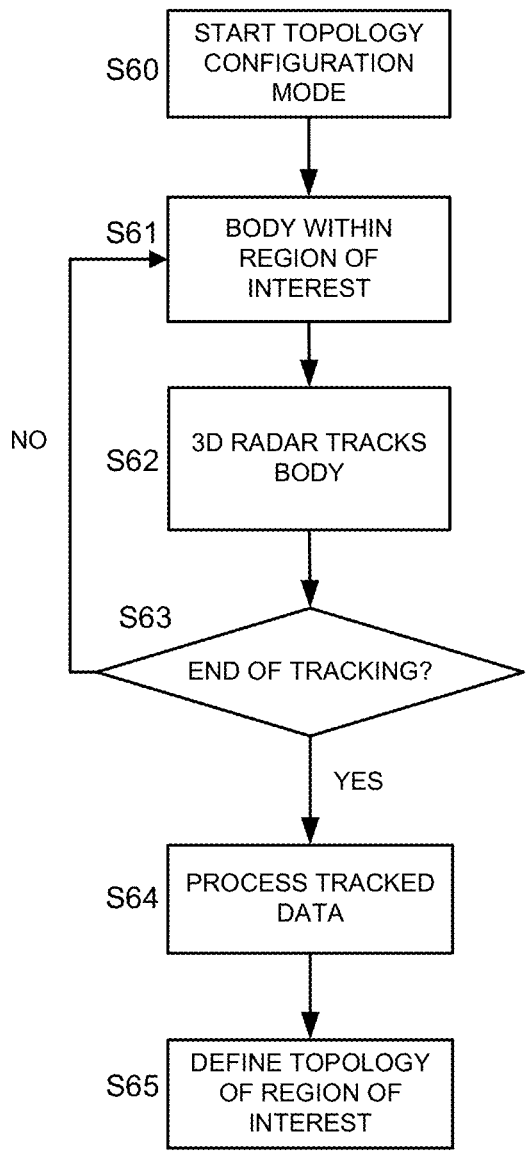
FIG. 17 is a flow diagram of an example method of topology mapping.

FIG. 17 is a flow diagram of an example method of topology mapping using 3D radar.

In step S60 the configuration mode is initiated and in step S61 the body, such as a human, moves over the surface in a region of interest. In step S62 the 3D radar tracks the body until the operator stops the tracking in step S63. In step S64 the tracked data measurements are processed, to define a 3D topological map of the surface of the region of interest in step S65.

Figure 18:
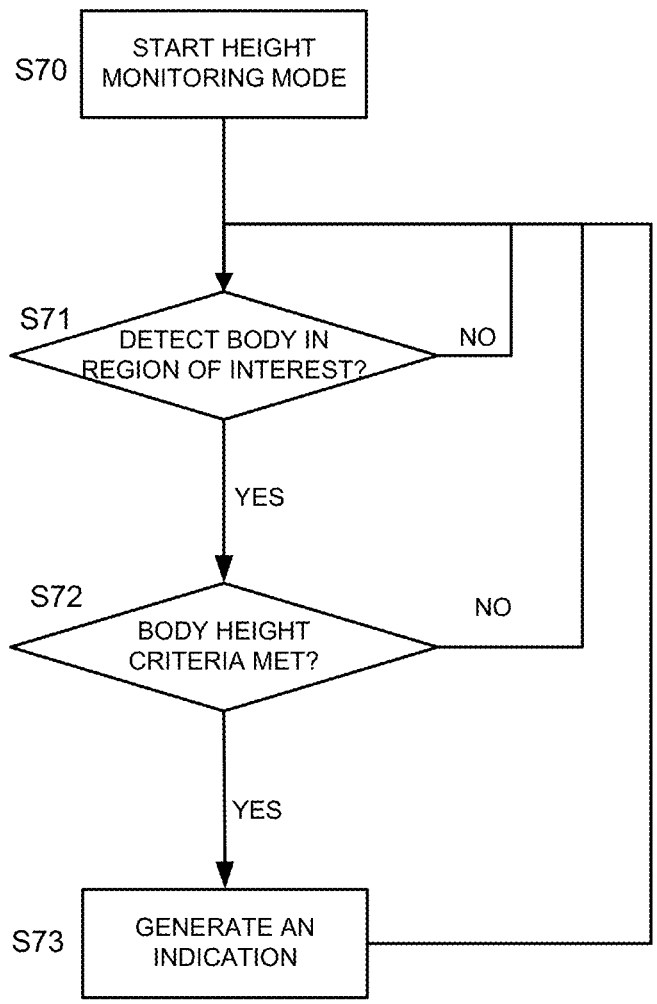
FIG. 18 is a flow diagram illustrating steps of an example configuration mode including height determination associated with a body.

FIG. 18 is a flow diagram illustrating steps of an example configuration mode including height determination, which in this example is a height of a radar measurement centre, i.e., its elevation above the mapped surface.

In step S70 the monitoring mode is started. In step S71 the process awaits the detection of a body in the region of interest by the 3D radar. In step S72 it is then determined whether the criteria for the height of the body's radar measurement centre is met. If not, the process returns to step S71. If it is met, an indication can be generated in step S73. As will be appreciated, the order of steps S71 and S72 may be swapped.

In this embodiment, the criteria may comprise a height range or a threshold height i.e., is the height above or below a threshold. The use of the criteria assists in avoiding erroneous detections from objects that are not the desired object to be detected i.e., the object is too tall or too short. The height can be determined, for example, by simply subtracting the z coordinates for the topology at the x, y location of the location of the object from the z coordinates of the location of the object. The height may alternatively be calculated by determining distance from the coordinate to the surface in a direction that is orthogonal to the plane of best fit. Although this may not be a true height if the surface is titled, the person skilled in the art will appreciate that it will be sufficiently close to the true height in the vast majority of applications, since the plane of best fit will not generally have a sufficient divergence from horizontal to cause a significant error in the calculated height.

Although the embodiments have been described with reference to monitoring the location of a human, the system and method of the present invention is applicable to the monitoring of the location of any body, including any animal or moving object.

Further, as the location may be a radar measurement centre, a determined height associated with an object may be a height of the measurement centre of the object, i.e., the elevation of the measurement centre above the ground. In alternative embodiments, however, the determined location associated with a body have an association with the body that is not its measurement centre. For example, a determined height may, instead of representing a radar measurement centre, represent a location of a highest part of the body (a person/animal/object), for example a person's head when standing. Determining the height of a location associated with the top of the object may use an assumption that the object has a known fixed shape, size and orientation, so that the top of the object may be calculated once the location of its measurement centre is known. Alternatively, determining the height of a location associated with the top of the object may be a determining of a highest point among a cluster of measurement points reflected from the body, with sufficient resolution to represent the shape of the body (e.g., including a measurement point from the person's head).

The terms "first indication" and "second indication", as used herein, is not intended to imply a temporal ordering in which the first must precede the second.

Where a given item is referenced herein with the preposition "a" or "an", it is not intended to exclude the possibility of additional instances of such an item, unless context requires otherwise.

In all of the above embodiments, the location of an object can be based on the detection of a weighted centre of a radar cross section (a radar measurement centre) for the object in either 2D or 3D for 2D or 3D radar respectively. Optionally, a radar measurement centre may alternatively be defined in other ways.

Further, a "region of interest" as, used herein, can be any region of interest and may or may not be defined by a virtual fence.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

In addition, any priority document(s) of this application is/are hereby incorporated herein by reference in its/their entirety.

What is claimed is:

1. A processing system for defining a virtual fence and for detecting a body inside or outside a region of interest defined by the virtual fence, the processing system comprising:
   an input to receive radar signals from a radar antenna configuration; and
   a processor to operate:
   in a configuration mode to:
   process the radar signals to identify locations that lie along a boundary of a region of interest across a surface and are associated with at least one first body,
   process the identified locations to determine coordinates for defining a first virtual fence, and
   determine a second virtual fence based on a modification of said coordinates; and
   in a monitoring mode to process the radar signals to:
   detect a location of a second body on the surface;
   determine if the second body is inside or outside the first virtual fence; and
   determine if the second body is inside or outside the second virtual fence inside.

2. The processing system according to claim 1, wherein the radar signals comprise 3D radar signals, and the processor is configured to identify the locations associated with the at least one first body in 3D.

3. The processing system according to claim 1, wherein the processor is configured to receive an input from a user interface to modify at least some of the coordinates determined from the identified locations to define the first virtual fence.

4. The processing system according to claim 1, wherein the coordinates define the first virtual fence.

5. The processing system according to claim 1, wherein the processor is configured to generate a first indication if the second body is determined to be inside the first virtual fence and at least one second indication if the second body is determined to be inside the second virtual fence.

6. The processing system for defining a virtual fence and for detecting a body inside or outside a region of interest defined by the virtual fence, the system comprising:
   a radar antenna configuration to emit radiation and detect the emitted radiation reflected from the at least one first body and the second body as radar signals; and
   a processing system according to claim 1.

7. The processing system according to claim 1, wherein the first virtual fence and the second virtual fence are used together.

8. The processing system according to claim 1, wherein the second virtual fence is operable to be used in place of the first virtual fence.

9. The processing system according to claim 1, wherein the second virtual fence is automatically generated from the first virtual fence.

10. The processing system according to claim 9, wherein the second virtual fence is an extrapolation of the first virtual fence such that the first virtual fence fits within the second virtual fence.

11. The processing system according to claim 1, and further comprising a user interface operable to display a shape of the first virtual fence and provides selectable coordinate points at corners of the first virtual fence and faces between coordinate points, wherein a user can use the user interface to manually select and move coordinate points of the first virtual fence to form the second virtual fence.

12. The processing system of claim 1, wherein the first virtual fence is wholly encompassed within the second virtual fence, a first priority level of alert is transmitted to a first device when an object is newly detected in an area between the first virtual fence and the second virtual fence, and a higher priority level of alert is transmitted to the first device, when an object is newly detected in an area within the first virtual fence.

13. The processing system of claim 12, wherein the first device is a control panel that is located on-site, wherein the higher priority level of alert is also transmitted to an additional device.

14. A method of defining a virtual fence and for detecting a body inside or outside a region of interest defined by the virtual fence, the method comprising:
   receiving radar signals from a radar antenna configuration;
   in a configuration mode, processing the radar signals to identify locations that lie along a boundary of a region of interest across a surface and are associated with a first body, and processing the identified locations to determine coordinates for defining the virtual fence; and
   in a monitoring mode, processing the radar signals to detect a location of a second body on the surface to determine if the second body is inside or outside the virtual fence.

15. A carrier medium carrying processor implementable code, which, when executed by a processor, implements the method of claim 14.

16. The method according to claim 14, wherein the first virtual fence and the second virtual fence are used together.

17. The method according to claim 14, wherein the second virtual fence is operable to be used in place of the first virtual fence.

18. The method according to claim 14, wherein the second virtual fence is automatically generated from the first virtual fence.

19. The method according to claim 18, wherein the second virtual fence is an extrapolation of the first virtual fence such that the first virtual fence fits within the second virtual fence.

20. The method according to claim 14, and further comprising a user interface operable to display a shape of the first virtual fence and provides selectable coordinate points at corners of the first virtual fence and faces between coordinate points, wherein a user can use the user interface to manually select and move coordinate points of the first virtual fence to form the second virtual fence.

* * * * *